United States Patent
Mu et al.

(10) Patent No.: US 10,396,684 B2
(45) Date of Patent: Aug. 27, 2019

(54) COUPLED INDUCTOR FOR INTERLEAVED MULTI-PHASE THREE-LEVEL DC-DC CONVERTERS

(71) Applicant: Virginia Tech Intellectual Properties, Inc., Blacksburg, VA (US)

(72) Inventors: Mingkai Mu, Blacksburg, VA (US); Sizhao Lu, Blacksburg, VA (US); Yang Jiao, Blacksburg, VA (US); Fred C. Lee, Blacksburg, VA (US)

(73) Assignee: Virginia Tech Intellectual Properties, Inc, Blacksburg, VA (US)

( * ) Notice: Subject to any disclaimer, the term of this patent is extended or adjusted under 35 U.S.C. 154(b) by 24 days.

(21) Appl. No.: 14/957,743

(22) Filed: Dec. 3, 2015

(65) Prior Publication Data
US 2016/0172976 A1    Jun. 16, 2016

Related U.S. Application Data

(60) Provisional application No. 62/092,312, filed on Dec. 16, 2014.

(51) Int. Cl.
*H02M 1/12*    (2006.01)
*H02M 7/487*    (2007.01)
*H02M 7/493*    (2007.01)

(52) U.S. Cl.
CPC ........... *H02M 7/493* (2013.01); *H02M 7/487* (2013.01); *H02M 2001/123* (2013.01)

(58) Field of Classification Search
CPC .................................................... H02M 3/158
(Continued)

(56) References Cited

U.S. PATENT DOCUMENTS

2007/0228837 A1* 10/2007 Nielsen .................. H02J 9/062
                                                                  307/82
2012/0155124 A1*  6/2012 Cheng .................. H02M 3/337
                                                                  363/24
(Continued)

OTHER PUBLICATIONS

Implementation of a Non-Isolated Three Level DC/DC Converter Suitable for High Power Systems Robert M. Cuzner, Ashish R. Bendre DRS Power and Control Technologies Milwaukee, WI 0197-2618/07/$25.00 © 2007 IEEE http://ieeexplore.ieee.org/stamp/stamp.jsp?arnumber=4348052.*

*Primary Examiner* — Jue Zhang
*Assistant Examiner* — Trinh Q Dang
(74) *Attorney, Agent, or Firm* — W & C IP

(57) ABSTRACT

Output current ripple is reduced in a three-level DC-DC power converter by connecting a plurality of phase legs in parallel between a source of input power and an output of the power converter and conducting power from the source of input power to the power converter output in an interleaved manner. The large current that results from such interleaved operation is reduced to acceptable levels, potentially less than the output current ripple of the power converter by providing inversely coupled inductors having a mutual inductance preferably greater than the inductor of the power converter in respective phase legs and in series in the circulating current path to avoid any need to increase the power converter inductance due to the circulating current. The inductor and inversely coupled inductors are preferably integrated into a single magnetic element of compact design.

20 Claims, 27 Drawing Sheets

(58) Field of Classification Search
USPC .......................................................... 323/271
See application file for complete search history.

(56) References Cited

U.S. PATENT DOCUMENTS

2013/0242623 A1* 9/2013 Wei ..................... H02M 5/458
363/37
2013/0329471 A1* 12/2013 Escobar ................. H02M 7/42
363/40
2015/0085541 A1* 3/2015 Hu ....................... H02M 7/487
363/71

* cited by examiner

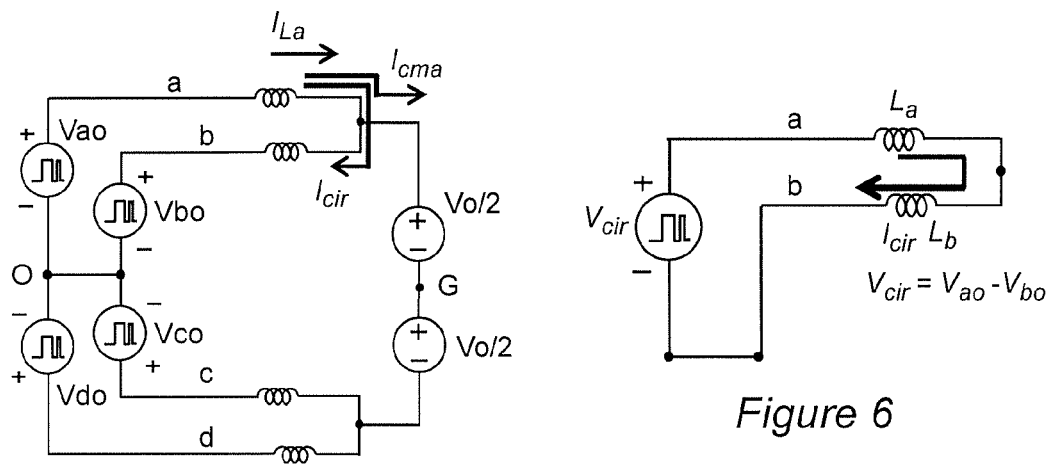
Figure 5
Figure 6
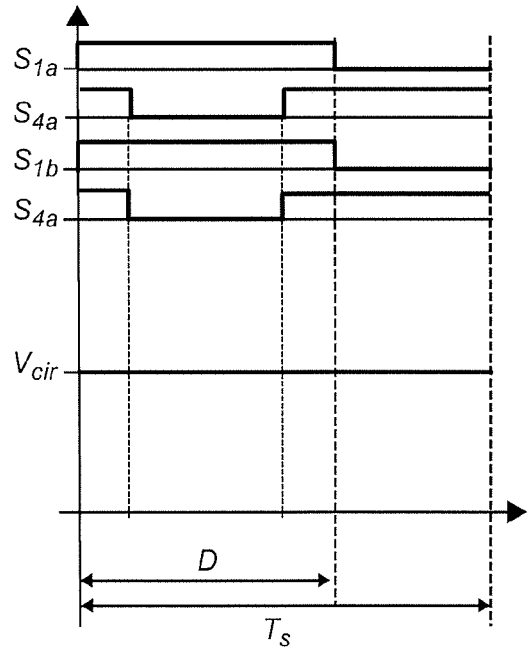
Figure 7

— Non-interleaving ---- N-type interleaving with coupled inductor
– – Z-type interleaving with coupled inductor — Non-interleaving ---- N-type interleaving

COUPLED INDUCTOR FOR INTERLEAVED MULTI-PHASE THREE-LEVEL DC-DC CONVERTERS

CROSS-REFERENCE TO RELATED APPLICATIONS

This application claims benefit of priority of U.S. Provisional Application 62/092,312, filed Dec. 16, 2014, which is hereby incorporated by reference in its entirety.

FIELD OF THE INVENTION

The present invention generally relates to switching power converters and switching voltage regulators and, more particularly, to multi-level, multi-phase interleaved switching power converters and switching voltage regulators capable of delivering high current at high voltage and which may be bi-directional and having reduced inductor ripple and overall output current ripple and common mode noise.

BACKGROUND OF THE INVENTION

While alternating current (AC) power is used for transferring power from a location where the power is generated to a remote load, many, if not most, loads other than electric motors require power at a direct current (DC), substantially constant voltage. Therefore, many of these potential loads require a dedicated power converter of a design that can accommodate their respective power requirements.

Local generation of power from renewable resources such as solar and wind turbine power generators has also favored local distribution of power as direct current at high voltages and currents. Some types of loads such as electrically powered vehicles may require large currents at high voltages that exceed the capacities of commercially available or economically feasible components such as switches which can be operated more efficiently than analog circuits and thus are generally favored. In switched converters for high voltage applications, three-level power converters are favored as reducing voltage stress on switches and allowing use of smaller passive components since three-level converters essentially provide two switched power converters such that their output voltages are summed. To meet high current requirements, it is common to provide two or more power converters in parallel. Such parallel-connected power converters operated as a single power converter are generally referred to as multi-phase power converters and, while any number of phases or "legs" may be provided (e.g. ten or more), two to four parallel-connected power converters are most common.

It is possible to drive the individual parallel-connected power converters of a multi-phase power converter in phase with each other. However, doing so results in a substantial output ripple voltage and input and output ripple current, requiring large input and output capacitances. For that reason, it is much more common to provide switching operations in the respective legs which is out-of-phase by a particular angular difference. More specifically, it is more common to control switching such that the output current of each phase has a (usually equal) phase difference so that the sum of the output currents will have a higher equivalent frequency and smaller ripple. Such operation is referred to as interleaving.

However, when the legs of a multi-phase, three-level power converter are operated in an interleaved manner for output current ripple and output capacitor size reduction, the parallel connection allows an abnormally large circulating current ripple in the inductor current which is larger than the output current ripple. This circulating ripple current is a source of resistive losses in the inductors and other circuitry, increased turn-off switching losses and requires a larger inductor to maintain a given level of input and output ripple. Therefore, use of interleaved operation of a power converter to reduce input and output ripple has compromised both efficiency and power density as well as cost and weight.

A three-level power converter, whether or not operated in an interleaved manner, may also cause common mode (CM) noise to be developed at the switching frequency, requiring attenuation by a filtering arrangement to prevent CM noise from being reflected back to the power source. Interleaved operation will reduce the CM noise somewhat but causes high circulating current which is not tolerable for practical use. Since the frequency of the CM noise is at the switching frequency which is relatively low to limit switching losses, the CM filter required for attenuation at the switching frequency is therefore usually relatively large and a significant fraction of the total volume of the power converter, which, in turn, tends to limit the power density of the power converter design.

Since high power density of a power converter is a very desirable attribute, sophisticated designs have been developed to increase power density to the point of principally being a function of the limitations of output ripple current, circulating ripple current and common mode noise specifications. Thus, in high power applications, passive components are a major factor affecting power converter system costs, volume and weight while input and output ripple specifications are becoming more stringent in some applications such as photovoltaic (PV) cell arrays for solar power generation where ripple causes deleterious effects on the PV cells.

SUMMARY OF THE INVENTION

It is therefore an object of the present invention to provide a multi-phase interleaved power converter having reduced output current ripple current, reduced inductor ripple current and common mode noise, improved efficiency and increased power density.

It is another object of the invention to provide an inductor structure which allows reduced output current ripple, reduced inductor current ripple and reduced common mode noise at an increased frequency for a given switching frequency with consequent CM noise filter size reduction to be simultaneously achieved.

It is a further object of the invention to provide an integrated inductor and inverse-coupled inductors of small size, weight and cost to reduce power converter volume and increase power density.

In order to accomplish these and other objects of the invention, a multi-phase three-level power converter is provided having a plurality of phase legs wherein the conduction angles of respective ones of the phase legs are interleaved converter including an inductor in series with each phase of each side of the three level converter, and a reverse-coupled pair of inductors having one coil in series with the inductor and another coil in series with the one coil in a circulating current path resulting from the interleaving of phases of the three-level power converter.

In accordance with another aspect of the invention, a magnetic element is provided including a plurality of coils on respective legs of a magnetic core including at least two pairs of coils wherein respective coils of each pair of coils are inversely coupled, and a magnetic circuit coupling the at least two pairs of coils such that each pair of coils is positively coupled to each other pair of coils.

In accordance with a further aspect of the invention, a method of reducing output current ripple in a three-level DC-DC power converter is provided comprising steps of connecting at least two of phase legs in parallel, each said phase leg including an inductor, conducting power from a power source through each of the at least two phase legs in an interleaved manner, and generating a voltage that reduces current circulating in the at least two phase legs due to interleaving of the conducting of power in the phase legs in an interleaved manner.

BRIEF DESCRIPTION OF THE DRAWINGS

The foregoing and other objects, aspects and advantages will be better understood from the following detailed description of a preferred embodiment of the invention with reference to the drawings, in which:

FIG. 5 illustrates an equivalent circuit of the DC-DC converter of FIG. 4, FIG. 6 is an equivalent circuit of the circuit of FIGS. 4 and 5 for circulation current, FIG. 7 illustrates waveforms of the circuit of FIG. 4 without interleaving.

DETAILED DESCRIPTION OF A PREFERRED EMBODIMENT OF THE INVENTION

Figure 1:
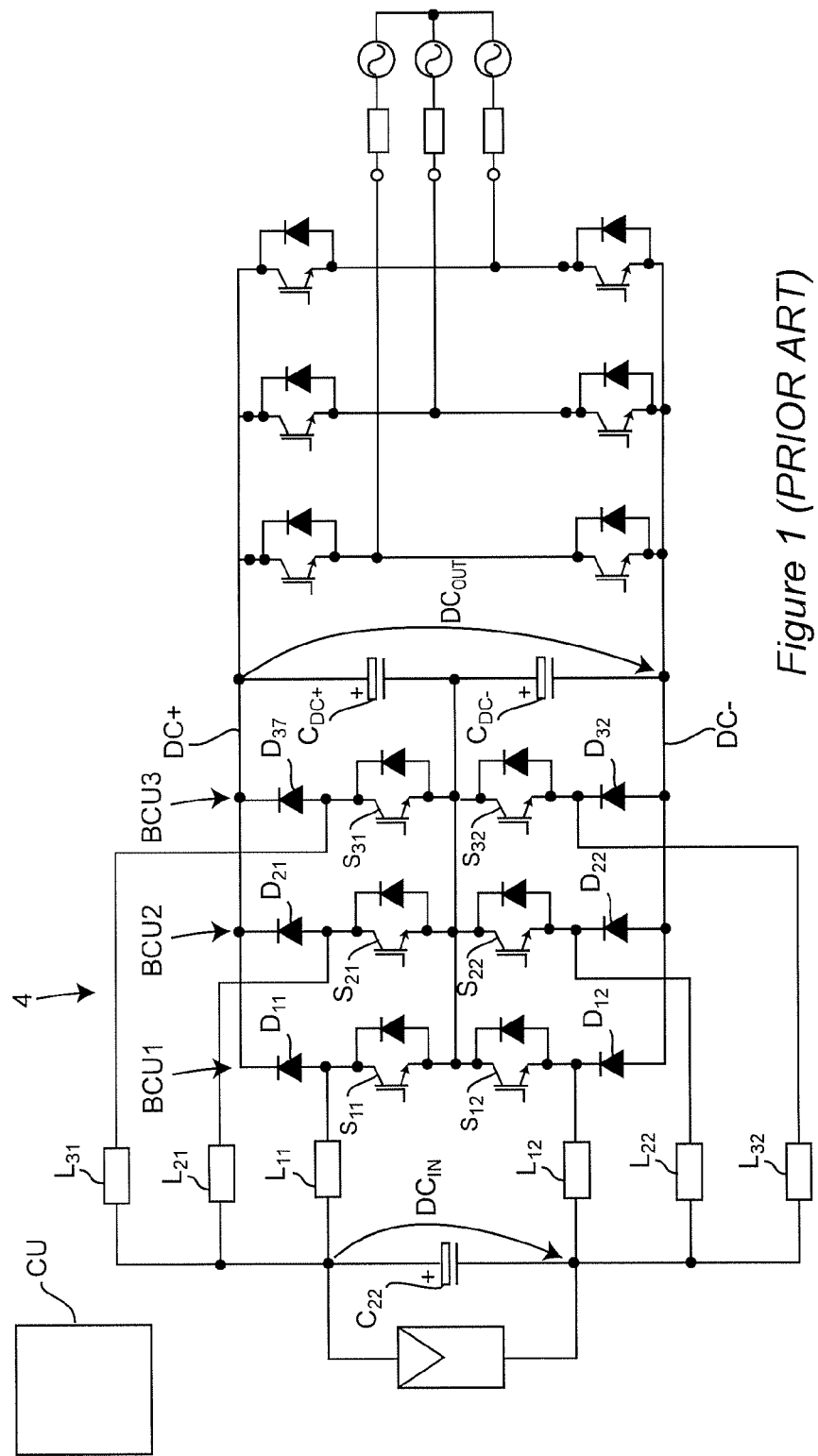
FIG. 1 schematically illustrates a generalized three-level multi-phase power converter, FIG. 2 schematically illustrates a known two-phase paralleled three-level bi-directional converter that is operable in either a buck or boost mode, FIG. 3 schematically illustrates a known Interleaved, zero current transition three-level power converter, FIG. 4 schematically illustrates a generalized two-phase paralleled three-level DC-DC converter useful for understanding the impact of interleaved operation on inductor current ripple.

Referring now to the drawings, and more particularly to FIG. 1, there is shown a generalized schematic diagram of an interleaved three-level converter (iTLC) having three phase three-level converter (TLC) legs or buck/boost converter units (BCUs) that has been proposed for PV applications in order to reduce input and output current ripple. As alluded to above, high frequency current ripple is particularly undesirable in regard to solar power collectors and causes premature aging and failure of PV cells in the solar collector PV array(s). In this power converter circuit topology, the input and output current ripple will be greatly reduced and the size or value of input and output capacitors can be greatly reduced to meet current ripple specifications due to the cancellation effect of interleaving as shown in the following Table I. The angular references are to the leading edge of on-time of the switches indicated.

TABLE I

| BCU1 | | BCU2 | | BCU3 | |
|---|---|---|---|---|---|
| $S_{11}$ | 0 | $S_{21}$ | $2\pi/3$ (120°) | $S_{31}$ | $4\pi/3$ (240°) |
| $S_{12}$ | $\pi/3$ (60°) | $S_{22}$ | $\pi$ (180°) | $S_{32}$ | $5\pi/3$ (300°) |

However, as alluded to above, the interleaving operation will create large and significant circulation currents among the paralleled phases/BCUs and the inductor current ripple in each phase will become larger as the overall input and output current ripple is reduced; requiring a larger inductor to be used to maintain a given low level of inductor current ripple.

Figure 2:
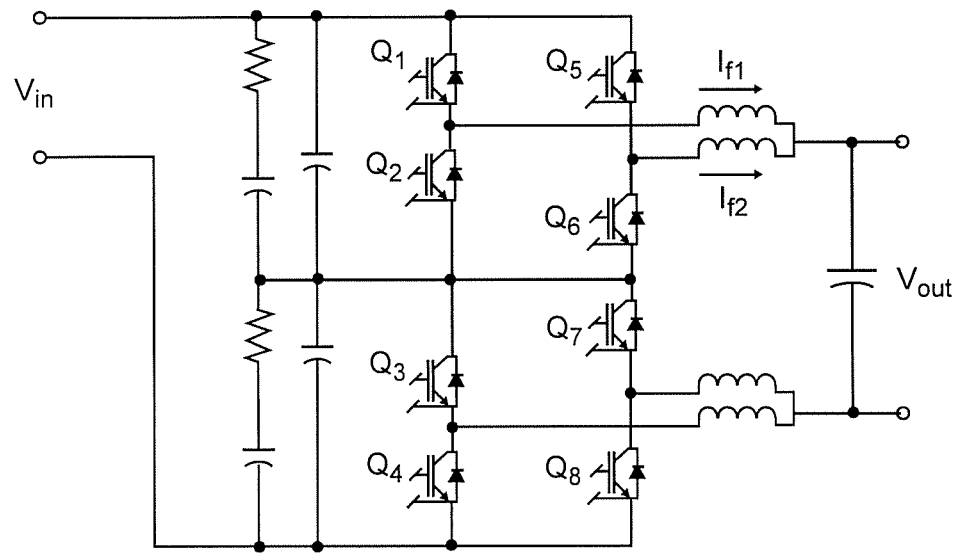

In another proposed power converter topology suitable for high power applications as illustrated in FIG. 2, to eliminate the circulating current between two phases, the controllable devices of the two phase legs are switched in-phase as shown in Table II. The inner switches are operated in a complementary fashion to provide free-wheel current or simultaneously with the indicated switches to provide a current return path. As alluded to above, in boost mode operation the inner switches are controlled as indicated in Table I and freewheel current and a current return to the source are provided by the outer switches, operated in a complementary manner to the inner switches.

TABLE II

| | Phase leg 1 | | Phase leg 2 |
|---|---|---|---|
| $Q_1$ | 0 | $Q_5$ | 0 |
| $Q_4$ | $\pi$ (180°) | $Q_8$ | $\pi$ (180°) |

In such an approach, the paralleled converters have the same combined behavior as a single phase but the load current is shared between the two phases. Therefore, there is no circulating current but some reduction in input and output capacitor size can be achieved as a trade-off with input and output current ripple magnitude.

Figure 3:
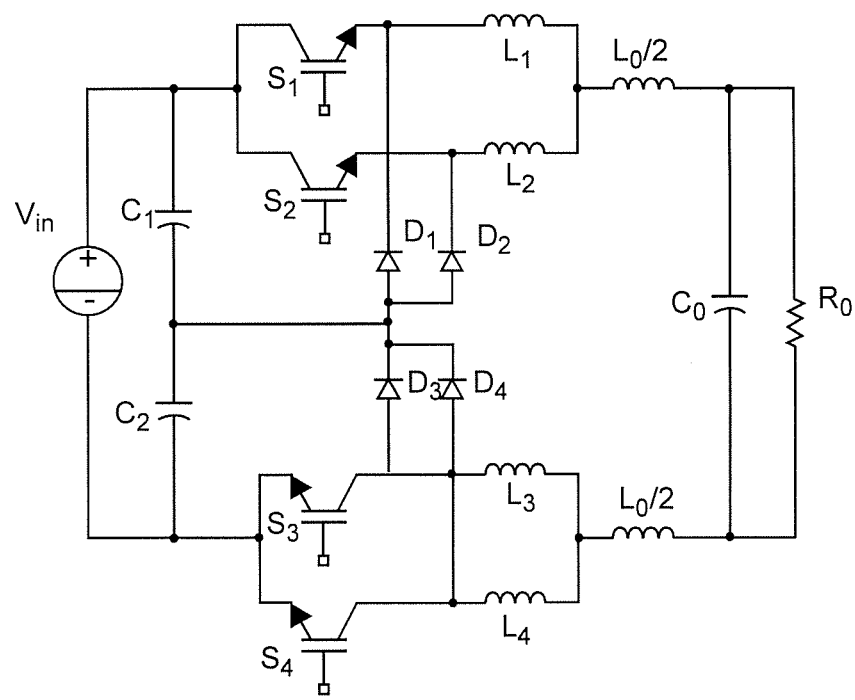

Another previously proposed power converter topology is illustrated in FIG. 3 in which two interleaved converters conduct current to the load alternately in a non-overlapping fashion rather than simultaneously as in the topology of FIG. 2. Small auxiliary inductors are added to achieve zero current turn-on transitions to reduce losses associated with reverse diode recovery. In this topology, the two interleaved converters conduct alternately rather than simultaneously. However, the duty cycle is limited to 0.5 or less for two phases, 0.33 for three phases and so on and thus duty cycle utilization is low and power delivery is thus only marginally improved, if at all, over a single phase inverter although less expensive components can be used since voltage stress is reduced. Moreover, while diode reverse recovery losses at turn-on are eliminated, each device is turned off at total load current rather than half the load current (when the turn-on periods overlap) and, since IGBT switches are commonly used for high power applications, turn-off losses will dominate the total switching loss because of the large parasitic inductance of the commutation loop. For these reasons, use of this topology in high power applications is limited.

Therefore, it is seen that the problems of reducing input and output ripple of high power multi-phase three-level DC-DC power converters and the generation of large circulating currents due to interleaving of phases to partially cancel input and output current ripple consistent with limitation of cost, size and weight of the power converter have proven quite intractable despite the proposal of very sophisticated power converter designs since the cause of the circulating current has not been analyzed and no detailed analysis is known in the literature. However, the inventors have discovered that circulating currents between phases and losses associated therewith can be avoided by provision of reverse-coupled mutual inductance between/across interleaved power converter phases in the circulating current path. This discovery is highly counter-intuitive since coupled inductors are usually used for using a current on one circuit to induce a voltage in another circuit and not for partial current cancellation in a single circuit, Further, such partial cancellation can be made to an apparently arbitrary degree and without affecting the input and output current ripple, reduced by interleaving, in any way or requiring any change in size of value of the inductor. Some other benefits of using a coupled inductor, as will be discussed below, are also completely unexpected. Moreover, the inventors have discovered that such mutual inductance can be provided in a structure which is integrated with inductances in a very compact and easily fabricated structure which provides additional benefits in power density and other desirable attributes of a power converter. The impact of interleaving on power converter operation and the reduction of circulating currents by use of a coupled inductor will now be discussed in detail.

Figure 4:
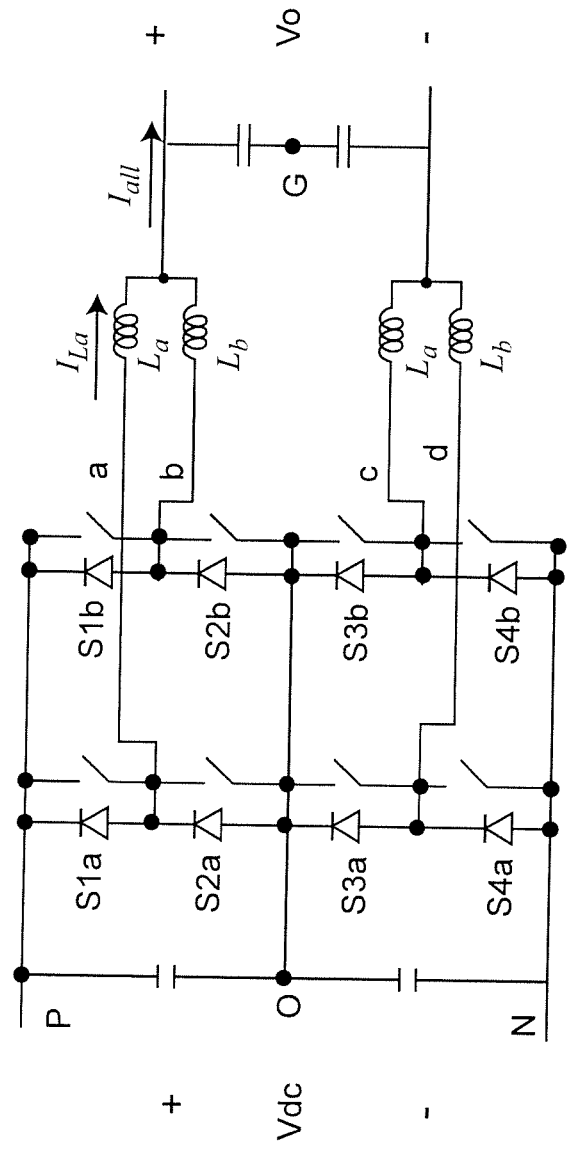
Figure 8A:
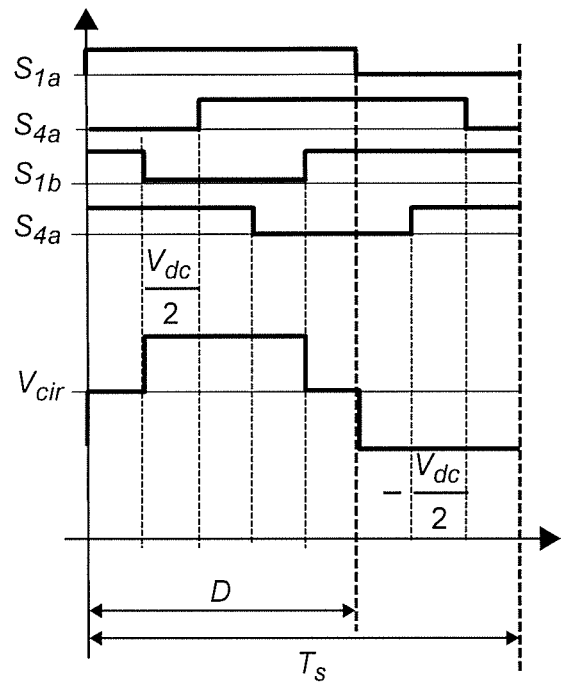
FIG. 8A illustrates the waveforms of the circuit of FIG. 4 with N-type interleaving.
Figure 8B:
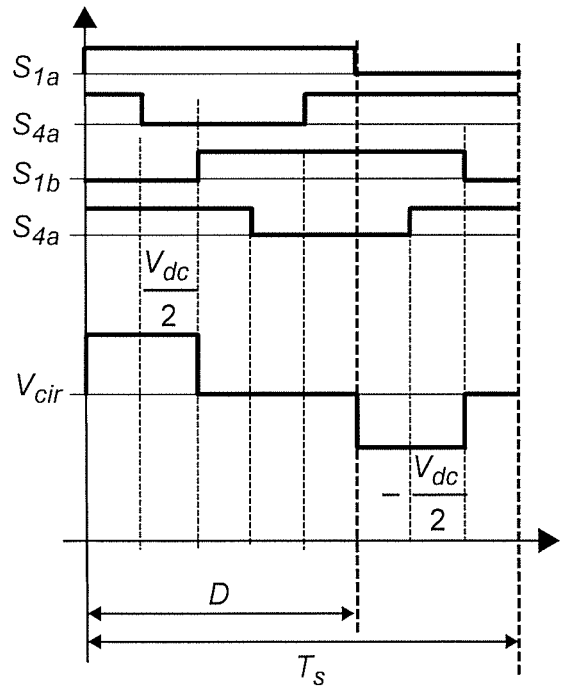
FIG. 8B illustrates the waveforms of the circuit of FIG. 4 with Z-type interleaving.

A schematic diagram of a two-phase, three-level paralleled DC-DC converter that is generalized to facilitate investigation of the impact of interleaving on input and output ripple and circulating currents is illustrated in FIG. 4. The switches are generalized as a diode connected across each switch since a parasitic diode will generally be formed in devices (e.g. power FETs, IGBTs and the like) suitable for power switching applications. The upper, positive side and the lower, negative sides of the converter are completely symmetrical and present two switching poles. 1a-2a, 3a-4a, and 1b-2b, 3b-4b, which are connected in series. Two series connected capacitors are provided at both the input and output. Moreover, this power converter topology is capable of operating as either a buck or boost converter and can transfer power bi-directionally. The outer active devices/switches $S_{1a}$, $S_{1b}$, $S_{4a}$, $S_{4b}$, are operated in the buck mode and the inner switches, $S_{2a}$, $S_{2b}$, $S_{3a}$, $S_{3b}$, are operated in the boost mode with freewheel current being provided through the diodes of the inner or outer devices, respectively.

The impact of interleaving is similar regardless of whether the power converter is operated in the buck or boost mode and an analysis of the simpler buck mode of operation will be sufficient for an understanding of the impact of interleaving in the boost mode, as well, for those skilled in the art. The generalization of the circuit of FIG. 4 also allows it to be operated in a non-interleaved mode or in either a so-called N-type or Z-type interleaving mode (which differ by the sequence order of switching on-times-so-called by the switching sequence order tracing a "backward N" or "Z" shape on the switching devices) that affect voltage waveforms of the respective phases and, hence, the voltage difference, $V_{GO}$, between point O at the midpoint of $V_{dc}$ and point G, the midpoint of the capacitive voltage divider at the output.

For the generalized circuit of FIG. 4, the phase shifts for non-interleaving, N-type interleaving and Z-type interleaving are provided in the following Tables III-V, respectively. Conversely, each of these modes of operation is considered to be defined by the phase shift sequences in these Tables.

TABLE III

Non-interleaving

| Phase 1 | | Phase 2 | |
|---|---|---|---|
| $S_{1a}$ | 0 | $S_{1b}$ | 0 |
| $S_{4a}$ | π (180°) | $S_{4b}$ | π (180°) |

TABLE IV

N-type interleaving

| Phase 1 | | Phase 2 | |
|---|---|---|---|
| $S_{1a}$ | 0 | $S_{1b}$ | π (180°) |
| $S_{4a}$ | π/2 (90°) | $S_{4b}$ | 3π/2 (270°) |

TABLE V

Z-type interleaving

| Phase 1 | | Phase 2 | |
|---|---|---|---|
| $S_{1a}$ | 0 | $S_{1b}$ | π/2 (90°) |
| $S_{4a}$ | π (180°) | $S_{4b}$ | 3π/2 (270°) |

(Note that by following increasing angles in Tables IV and V, a "backwards N" and Z patterns are traced respectively, in these tables, as well as in the schematic diagram of the switches. Note also that the inner switches are not specified but would be substituted for the adjacent specified outer switch if this discussion were directed or extended to boost operation rather than limited to buck operation. This symmetry clearly indicates that the impact of interleaving on the respective buck and boost modes would, indeed, be very similar, as alluded to above.)

To analyze the impact of interleaving on the circuit of FIG. 4, an equivalent circuit representing the switching poles by four controlled voltage sources an output capacitors are represented by two constant voltage sources is shown in FIG. 5. Since the circuit is symmetrical, the voltage $V_{GO}$ is given by $$V_{GO}=(V_{ao}+V_{bo}+V_{co}+V_{do})/4. \quad (1)$$

The inductor current flow can be expressed as $$I_{1a}=I_{cma}+I_{cir} \quad (2)$$

where $I_{cma}$ is the output current and $I_{cir}$ is the circulating current between the two phases. Thus, the inductor current is related to both the output current and the circulating current which, in turn, is created by the voltage mismatch between the two phases, $V_{cir}$. Different phase shift angles and different duty cycles will create different $V_{cir}$ waveforms and amplitudes and have different impacts on the inductor current ripple. Since $V_{cir}$ can also be represented by a controlled voltage source and the circuit is symmetrical for any combination of switches, a simplified equivalent circuit model for the circulating current can be derived as shown in FIG. 6. This simplified equivalent circuit model is labeled to correspond to nodes a and b and the switches connected to those nodes as shown in FIG. 4 but is valid for all pairs of nodes and switches that include both phases.

The waveforms of $V_{cir}$ in the converter of FIG. 4 for non-interleaving, N-type interleaving and Z-type interleaving are illustrated in FIGS. 7-8A and 8B, respectively. The duty cycles, D, illustrated are chosen such that the phases overlap symmetrically but are otherwise arbitrary and consistent for all of FIGS. 7-9.

From FIG. 7, it can be seen that for the non-interleaving mode of operation, $V_{cir}$ will always be zero and that there is no circulating current between the two phases, as alluded to above. That is, for the non-interleaving case the inductor ripple can be expressed as:

$$\Delta I_L = \begin{cases} \dfrac{V_{dc} \cdot T_s}{4L} \cdot (1-2D) \cdot D & 0 < D \leq 0..5 \\ \dfrac{V_{dc} \cdot T_s}{4L} \cdot (1-D) \cdot (2D-1) & 0.5 \leq D < 1 \end{cases} \quad (3)$$

where $V_{dc}$ is the DC link voltage, $T_s$ is the switching period $L=L_a=L_b$ is the inductance and D is the duty cycle. The overall output current ripple will be double the inductor ripple since both phases or legs contribute to the output current and, hence, output current ripple because they are switched in phase with each other. Therefore, the overall current ripple is given by:

$$\Delta I_{all} = 2 \cdot \Delta I_L = \begin{cases} \dfrac{V_{dc} \cdot T_s}{2L} \cdot (1-2D) \cdot D & 0 < D \leq 0..5 \\ \dfrac{V_{dc} \cdot T_s}{2L} \cdot (1-D) \cdot (2D-1) & 0.5 \leq D < 1 \end{cases} \quad (4)$$

The maximal inductor current ripple is given by:

$$\Delta I_{L\_max} = \dfrac{V_{dc} \cdot T_s}{4L} \cdot \dfrac{1}{8} \quad (5)$$

and the maximal overall output current ripple is given by:

$$\Delta I_{all\_max} = \dfrac{V_{dc} \cdot T_s}{2L} \cdot \dfrac{1}{8} \quad (6)$$

For N-type and Z-type interleaving, there will be a voltage imbalance between nodes G and O during parts of the switching period, $T_s$, and $V_{cir}$ will be a square pulse, three-level waveform having a pulse amplitude of $\pm V_{dc}/2$. It should be noted from a comparison of FIGS. 8A and 8B that the volt-second product of $V_{cir}$ will be greater for N-type interleaving than the Z-type interleaving. Therefore, for a two-phase three-level embodiment, N-type interleaving will produce a slightly greater circulating current than Z-type interleaving. This difference is most apparent in these Figures.

For comparison and by a similar circuit analysis, for particular duty cycle ranges, the inductor current ripple for N-type interleaving can be derived as:

$$\Delta I_L = \begin{cases} \frac{V_{dc} \cdot (1-4D)}{8L} \cdot D \cdot T_s + \frac{V_{dc} \cdot D}{4L} \cdot T_s & D < 0.25 \\ \frac{V_{dc} \cdot (4D-1)}{16L} \cdot (1-2D) \cdot T_s + \frac{V_{dc} \cdot D}{4L} \cdot T_s & 0.25 \leq D < 0.5 \\ \frac{V_{dc} \cdot (3-4D)}{16L} \cdot (2D-1) \cdot T_s + \frac{V_{dc} \cdot (1-D)}{4L} \cdot T_s & 0.5 \leq D < 0.75 \\ \frac{V_{dc} \cdot (4D-3)}{8L} \cdot (1-D) \cdot T_s + \frac{V_{dc} \cdot (1-D)}{4L} \cdot T_s & 0.75 \leq D < 1 \end{cases} \quad (7)$$

and the overall output current ripple for N-type interleaving can be expressed as:

$$\Delta I_{all} = \begin{cases} \frac{V_{dc} \cdot (1-4D)}{4L} \cdot D \cdot T_s & D < 0.25 \\ \frac{V_{dc} \cdot (4D-1)}{8L} \cdot (1-2D) \cdot T_s & 0.25 \leq D < 0.5 \\ \frac{V_{dc} \cdot (3-4D)}{8L} \cdot (2D-1) \cdot T_s & 0.5 \leq D < 0.75 \\ \frac{V_{dc} \cdot (4D-3)}{4L} \cdot (1-D) \cdot T_s & 0.75 \leq D < 1 \end{cases} \quad (8)$$

Similarly, the inductor current ripple for Z-type interleaving can be derived as:

$$\Delta I_L = \begin{cases} \frac{V_{dc} \cdot (1-4D)}{8L} \cdot D \cdot T_s + \frac{V_{dc} \cdot D}{4L} \cdot T_s & D < 0.25 \\ \frac{V_{dc} \cdot (4D-1)}{16L} \cdot (1-2D) \cdot T_s + \frac{V_{dc} \cdot D}{16L} \cdot T_s & 0.25 \leq D < 0.5 \\ \frac{V_{dc} \cdot (3-4D)}{16L} \cdot (2D-1) \cdot T_s + \frac{V_{dc}}{16L} \cdot T_s & 0.5 \leq D < 0.75 \\ \frac{V_{dc} \cdot (4D-3)}{8L} \cdot (1-D) \cdot T_s + \frac{V_{dc} \cdot (1-D)}{4L} \cdot T_s & 0.75 \leq D < 1 \end{cases} \quad (9)$$

and the overall output current ripple for Z-type interleaving can be expressed as:

$$\Delta I_{all} = \begin{cases} \frac{V_{dc} \cdot (1-4D)}{4L} \cdot D \cdot T_s & D < 0.25 \\ \frac{V_{dc} \cdot (4D-1)}{8L} \cdot (1-2D) \cdot T_s & 0.25 \leq D < 0.5 \\ \frac{V_{dc} \cdot (3-4D)}{8L} \cdot (2D-1) \cdot T_s & 0.5 \leq D < 0.75 \\ \frac{V_{dc} \cdot (4D-3)}{4L} \cdot (1-D) \cdot T_s & 0.75 \leq D < 1 \end{cases} \quad (10)$$

From a comparison of these expressions, it is readily seen that overall output (and, hence, input) current ripples of both types of interleaving are much smaller than for the non-interleaving case but the circulating currents for both types of interleaving are larger than the overall output current ripple for the non-interleaving case and, of course, far greater than the zero circulating current in the non-interleaving case.

The above analysis has been verified by simulation and the results are presented in graphical form in FIGS. 9-12. For this simulation, the parameters are $P_o$=200 kW. DC link voltage, $V_{dc}$=1200V, switching period, $T_s$=50 μsec., duty cycle, D=0.6 non-coupled inductance $L=L_a=L_b$=60 μH and output capacitance, C=180 μF. A comparison of FIGS. 9 and 10 and FIGS. 11 and 12 clearly shows the large magnitude of the circulating current relative to the non-interleaving inductor current waveform and the overall output current ripple for the non-interleaving case. The ripple in the output current waveform is also of much reduced amplitude and twice the frequency of the ripple in the output current waveform for the non-interleaved case. The output current ripple for the non-interleaved case is also twice the amplitude of the ripple component in the inductor current, as alluded to above, due to the contribution of both phase legs to the output current ripple when interleaving is not employed.

Figure 9:
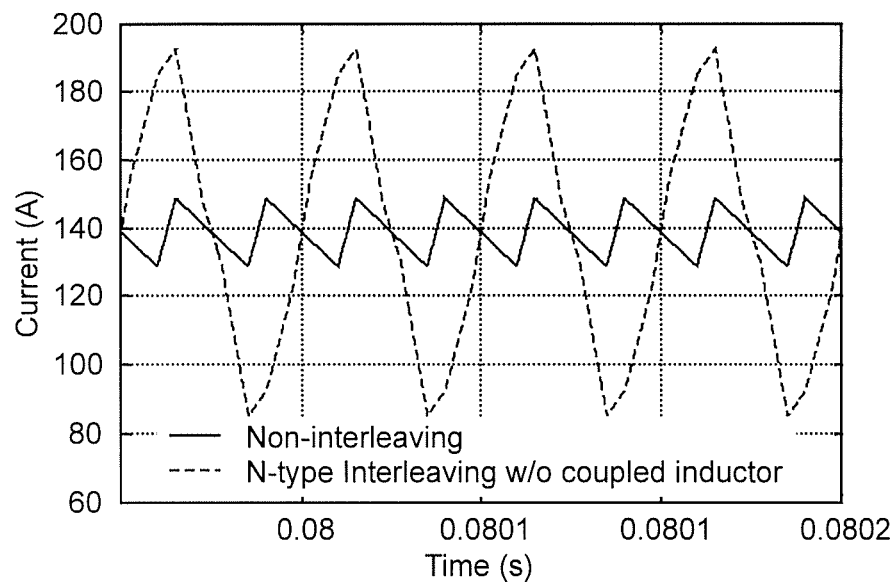
FIG. 9 is a graphical comparison of inductor current waveforms with and without N-type interleaving.
Figure 10:
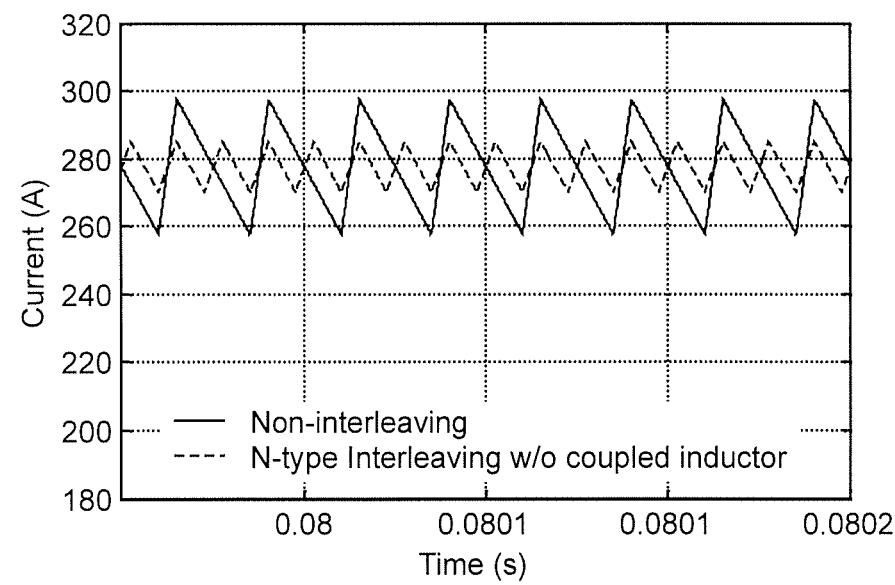
FIG. 10 is a graphical comparison of output current waveforms with and without N-type interleaving.
Figure 11:
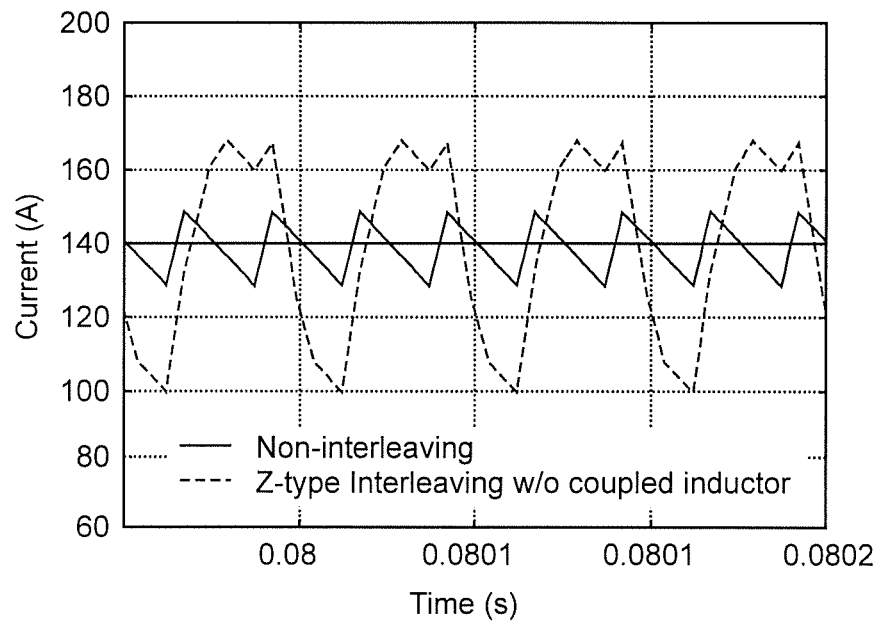
FIG. 11 is a graphical comparison of inductor current waveforms with and without Z-type interleaving.
Figure 12:
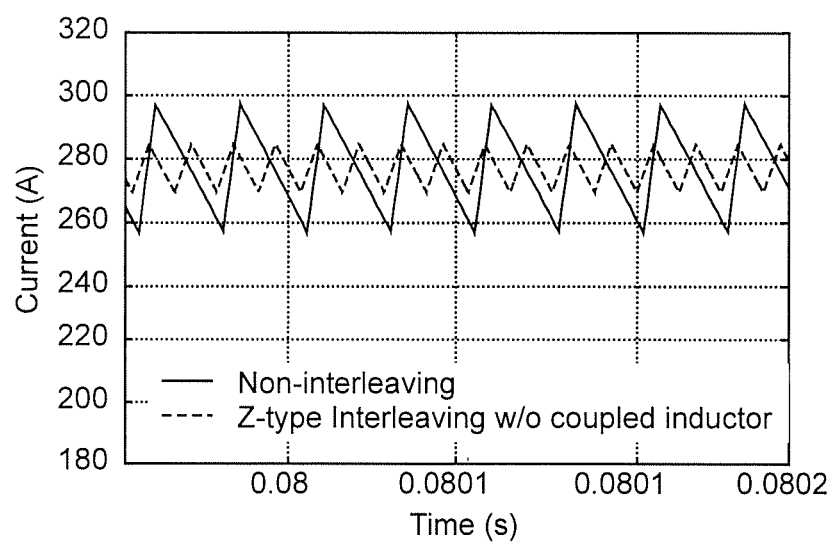
FIG. 12 is a graphical comparison of output current waveforms with and without Z-type interleaving, FIG. 13 schematically illustrates N-type interleaving in the circuit of FIG. 4 with an added reverse-coupled inductor.

Also, from a comparison of FIGS. 9 and 11 it is seen that the waveform of the circulating current for N-type interleaving is of greater amplitude and more nearly symmetrical than the highly distorted waveform for the circulating current resulting from Z-type interleaving. (Both inductor current waveforms are eight-segment piecewise-linear waveforms resulting from the $V_{cir}$ waveforms of FIGS. 8A and 8B.) These differences and their significance will be discussed in greater detail below.

Figure 13:
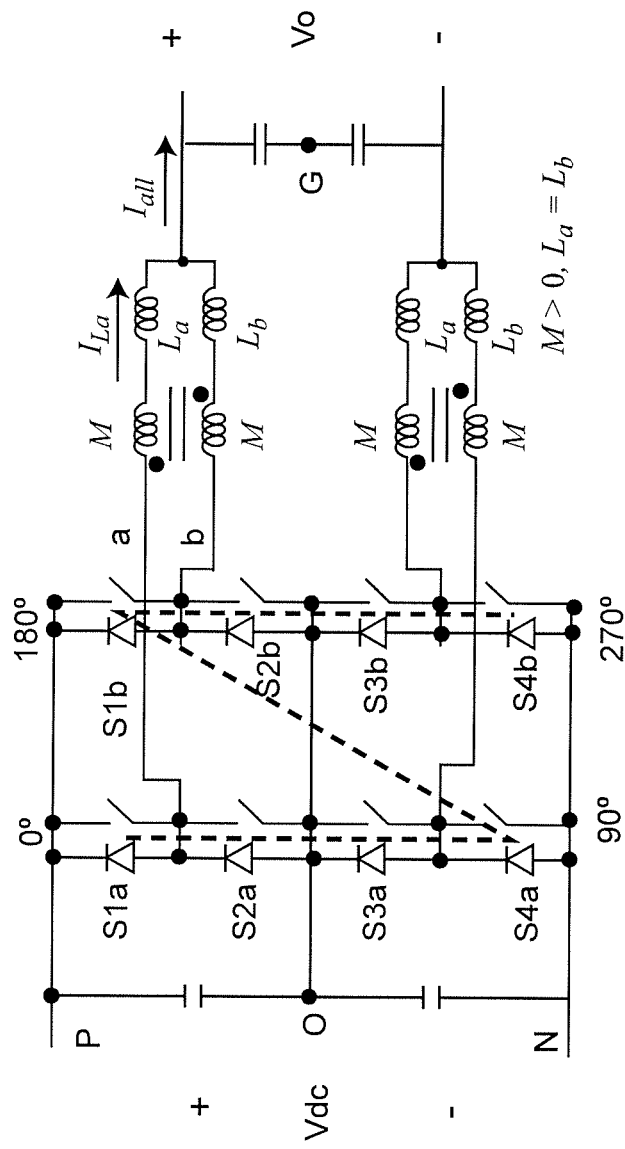

As noted above, the inventors have discovered that the circulating current resulting from either type of interleaving and the size of the inductor required thereby can be significantly reduced by the addition of a reverse-coupled inductor with coils placed in respective phases with both reverse-coupled coils placed in series in the circulating current path. Such a topology is illustrated in FIG. 13 which will be recognized as differing from the topology of FIG. 4 only in the addition of reverse-coupled inductors having mutual inductance, M, in both upper and lower sides of the power converter in addition to the non-coupled inductors, $L_a$ and $L_b$. For simplicity of analysis, the coils of the reverse-coupled inductor are shown separately from the non-coupled inductor coils. Somewhat different, preferred implementations will be described below in which these coils may be combined or integrated into a single, compact magnetic component. It is assumed that the inductances of the non-coupled inductors are equal, as before, and that the mutual inductance of the coupled inductors is non-zero and larger than the inductance of either of the non-coupled inductors. An analysis similar to that discussed above yields the following expressions for inductor current ripple for respective duty cycles:

$$\Delta I_L = \quad (11)$$

$$\begin{cases} \dfrac{V_{dc} \cdot (1-4D)}{8L} \cdot D \cdot T_s + \dfrac{V_{dc} \cdot D}{4(L+2M)} \cdot T_s & D < 0.25 \\ \dfrac{V_{dc} \cdot (4D-1)}{16L} \cdot (1-2D) \cdot T_s + \dfrac{V_{dc} \cdot D}{4(L+2M)} \cdot T_s & 0.25 \le D < 0.5 \\ \dfrac{V_{dc} \cdot (3-4D)}{16L} \cdot (2D-1) \cdot T_s + \dfrac{V_{dc} \cdot (1-D)}{4(L+2M)} \cdot T_s & 0.5 \le D < 0.75 \\ \dfrac{V_{dc} \cdot (4D-3)}{8L} \cdot (1-D) \cdot T_s + \dfrac{V_{dc} \cdot (1-D)}{4(L+2M)} \cdot T_s & 0.75 \le D < 1 \end{cases}$$

A comparison with expressions (8) reveals that 2M is added to the inductance, L, in the denominator of the second term if the expression for each duty cycle range. Therefore, it is clear that if the mutual inductance is increased, the second term in each expression will be reduced and, if infinitely large, the second term, reflecting the circulating current, would be zero and, since the inductor current ripple is only half the output current ripple for the non-interleaved case, a large mutual inductance, M, is much preferred. Essentially, the reverse coupled inductance, connected as shown across the two phases but in series with the circulating current path provides a voltage proportional to the mutual inductance in the circulating current path that opposes $V_{cir}$ and thus effectively cancels a portion of the circulating current in accordance with the value of the mutual inductance.

The addition of the reverse coupled inductor having a mutual inductance has no effect on the overall output current ripple which can be expressed as:

$$\Delta I_{all} = \begin{cases} \dfrac{V_{dc} \cdot (1-4D)}{4L} \cdot D \cdot T_s & D < 0.25 \\ \dfrac{V_{dc} \cdot (4D-1)}{8L} \cdot (1-2D) \cdot T_s & 0.25 \le D < 0.5 \\ \dfrac{V_{dc} \cdot (3-4D)}{8L} \cdot (2D-1) \cdot T_s & 0.5 \le D < 0.75 \\ \dfrac{V_{dc} \cdot (4D-3)}{8L} \cdot (1-D) \cdot T_s & 0.75 \le D < 1 \end{cases} \quad (12)$$

From a cursory comparison with the results of an analysis of FIG. 4, it will be apparent that expressions (12) are identical to expressions (8) or (10).

Similarly, the maximal inductor current ripple (determined by sweeping the duty cycle to find the maximum) is given by:

$$\Delta I_{L\_max} = \dfrac{V_{dc} \cdot T_s}{16L} \cdot \dfrac{\left(\dfrac{1}{4} - \dfrac{L^2}{(L+2M)^2}\right)}{2} + \dfrac{V_{dc} \cdot \left(\dfrac{3}{8} + \dfrac{L}{4(L+2M)}\right)}{4(L+2M)} \cdot T_s \quad (13)$$

and the maximal output current ripple is $$\Delta I_{all\_max} = \dfrac{V_{dc} \cdot T_s}{8L} \cdot \dfrac{1}{8} \quad (14)$$

which will be recognized as being the same as expression (6). Thus it can be seen that the inductor current ripple can be reduced while maintaining the ripple cancellation effect of interleaving and providing a further degree of cancellation of the circulating current ripple in the inductor through use of a reverse-coupled inductor having a suitably large mutual inductance.

The further analysis of the circuit of FIG. 13 has also been verified by simulation for N-type interleaving and using a mutual inductance of 500 μH while other parameters are maintained as in the simulation without the coupled inductors for comparison with the non-interleaving case (also without the coupled inductors since there is no circulating current). The results of simulation of N-type interleaving is graphically illustrated in FIGS. 14-19. In each of these Figures, the result of N-type interleaving with the coupled inductor is compared to the non-interleaved case without the coupled inductor which will be the same as in other, previously discussed simulation results. A comparison of the results using the coupled conductor with the results of simulation of the circuit of FIG. 4 in those same Figures will facilitate an appreciation of the effectiveness of the coupled inductor to reduce circulating currents as well as obtaining a more complete understanding of the invention.

Figure 14:
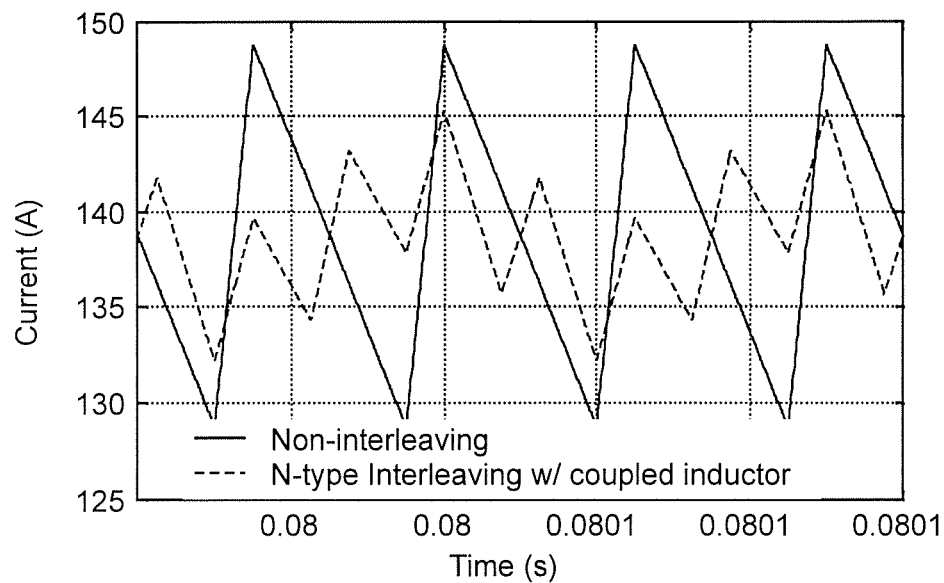
FIG. 14 is a graphical comparison of inductor current waveforms with and without N-type interleaving using a coupled inductor.
Figure 15:
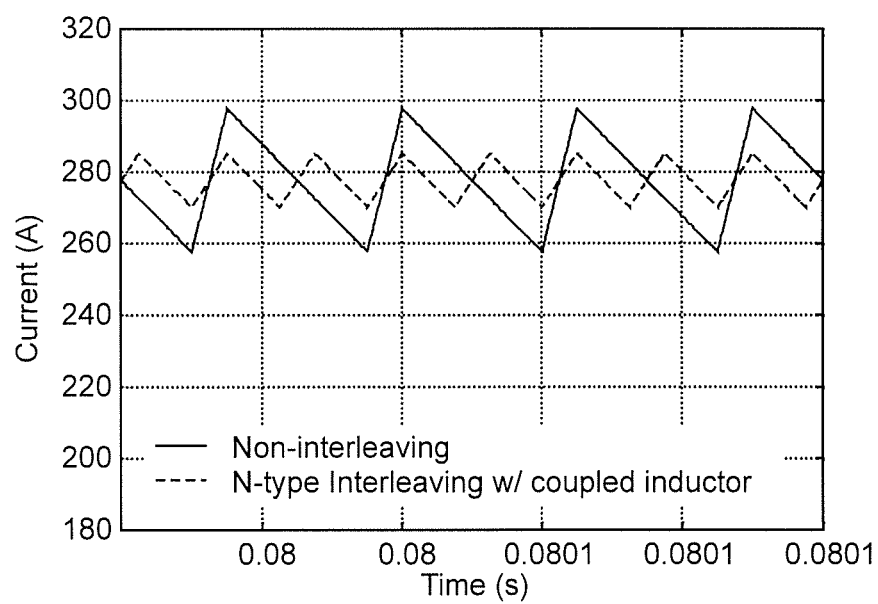
FIG. 15 is a graphical comparison of output current waveforms with and without N-type interleaving using a coupled inductor.
Figure 16:
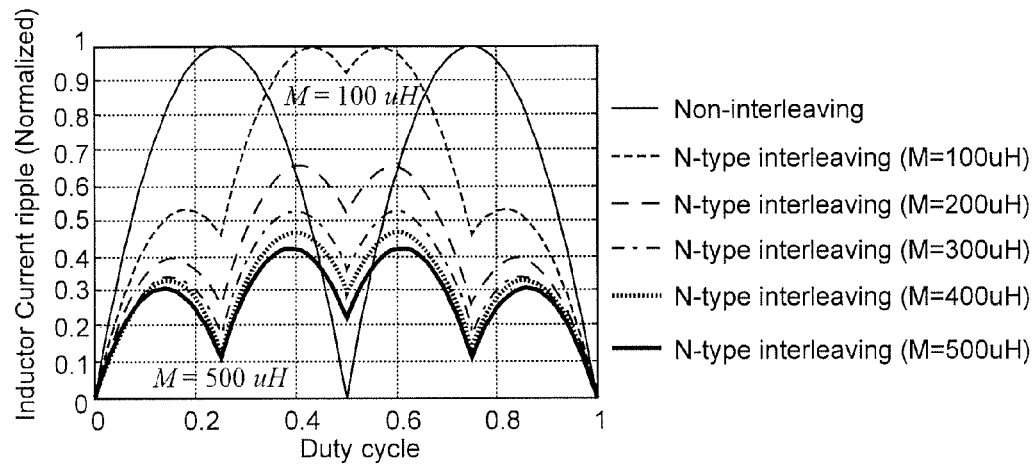
FIG. 16 is a graphical comparison of normalized inductor current ripple for N-type interleaving for coupled inductors of different values of mutual inductance with non-interleaved inductor current ripple.
Figure 17:
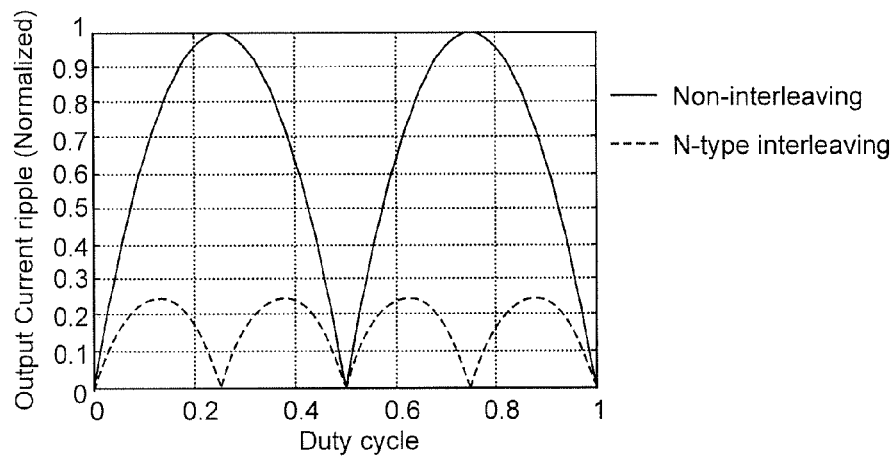
FIG. 17 is a comparison of normalized output current ripple for non-interleaved operation and N-type operation.

In FIG. 14 it is seen that the inductor current ripple (which also includes the circulating current for N-type interleaving) is much smaller in local (e.g. over a single switching cycle) magnitude than the non-interleaved case due to cancellation of a portion of the circulating current. The peak-to-peak ripple is also substantially smaller even though the inductor current ripple which has eight segments of linear current slope as alluded to above, caused by the coupled inductor and interleaving, oscillates. A comparison of FIG. 15 with FIG. 10, discussed above, indicates that the reduction of output current ripple is unaffected by the addition of the coupled inductor. The normalized (using the non-interleaving case inductor current ripple as the normalizing factor) inductor current ripple under different duty cycle conditions and for different mutual inductances is shown in FIG. 16 which confirms that inductor current ripple is reduced by increased cancellation of the circulating current ripple as the mutual inductance is increased. FIG. 16 also shows that the increment of circulating current cancellation for a given increment of mutual inductance diminishes and that little increase in circulating current cancellation can be expected above a particular value of mutual inductance, in this case, 500 μH. FIG. 17 shows that the normalized output current ripple is very much reduced and the ripple cancellation is maintained with the addition of the coupled inductor. The maximal (e.g. worst case duty cycle) output current ripple is held to about one-quarter of the magnitude of output current ripple of the non-interleaved case.

Figure 18:
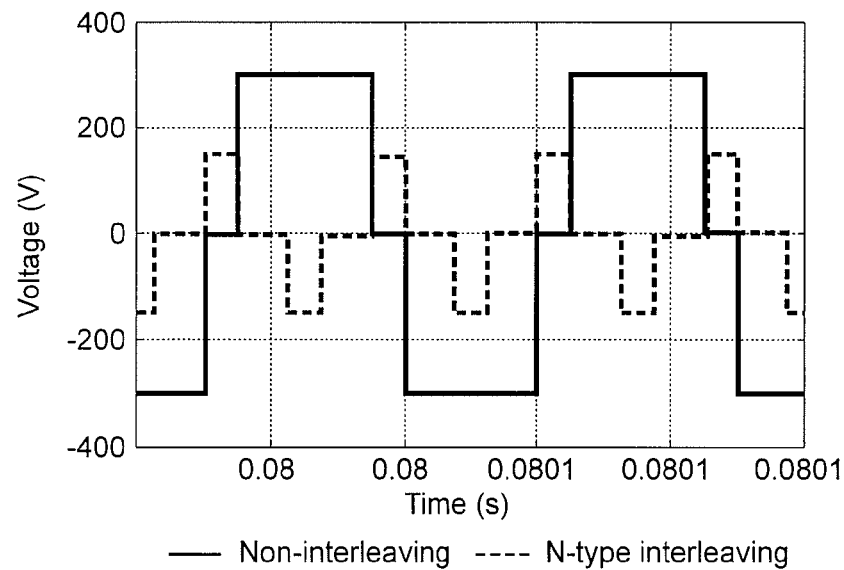
FIG. 18 is a graphical comparison of common mode voltage waveforms for interleaved and non-interleaved operation.
Figure 19:
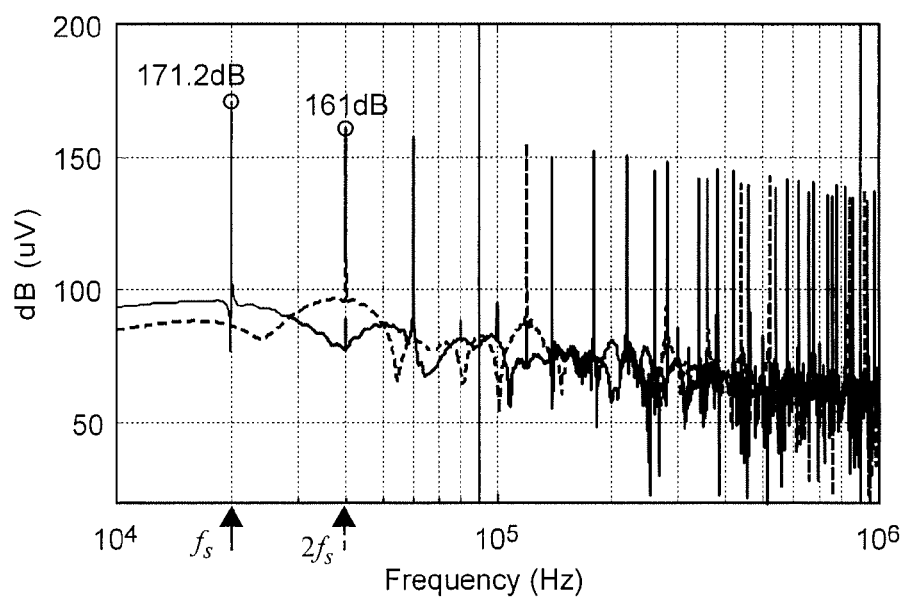
FIG. 19 is a graphical comparison of the common mode voltage spectrum for interleaved and non-interleaved operation, FIG. 20 schematically illustrates Z-type interleaving in the circuit of FIG. 4 with an added reverse-coupled inductor.

As alluded to above, $V_{GO}$, is the voltage between nodes G and O of FIG. 4 or 13 and, from the point of view of electromagnetic interference (EMI) appears as common mode (CM) noise which must be limited in practical applications. FIG. 18 shows the reduction in CM noise waveform amplitude achieved by interleaving as compared with the non-interleaved case. FIG. 19 shows the comparative voltage spectra on N-type interleaving and the non-interleaved case. It can be seen that the magnitude of CM noise at a duty cycle of D=0.6 is reduced by about 10 dBμV. (The magnitude of CM noise also varies with duty cycle and will be reduced to some degree at any duty cycle but perhaps not at much at other duty cycles producing less CM noise. Nevertheless, CM noise will be held to a relatively low level than can often be sufficiently attenuated by a fairly simple filter.) In addition, the lowest frequency peak of the CM noise is at twice the frequency (e.g. double the switching frequency) of the non-interleaved case; allowing increase of the corner frequency of the CM filter arrangement and a substantial reduction in physical size.

Figure 20:
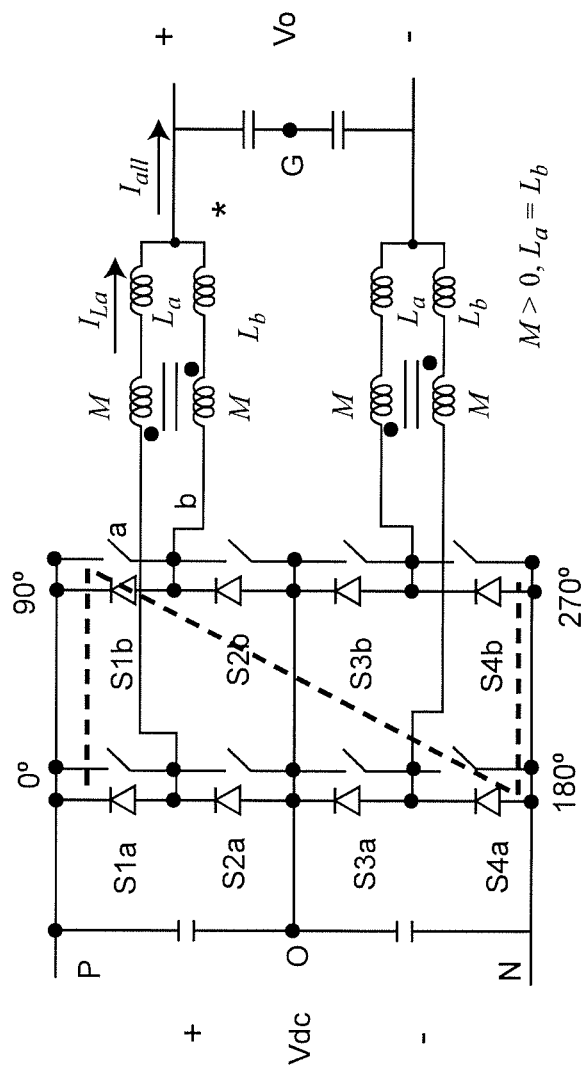

FIG. 20 shows a schematic power converter topology identical to that of FIG. 13, including the additional reverse-coupled inductors, except for a Z-type interleaving sequence being indicated (superimposed on the switching devices). By a similar circuit analysis to that discussed above, the inductor current ripple can be expressed as:

$$\Delta I_L = \begin{cases} \frac{V_{dc} \cdot (1-4D)}{8L} \cdot D \cdot T_s + \frac{V_{dc} \cdot D}{4(L+2M)} \cdot T_s & D < 0.25 \\ \frac{V_{dc} \cdot (4D-1)}{16L} \cdot (1-2D) \cdot T_s + \frac{V_{dc}}{16(L+2M)} \cdot T_s & 0.25 \le D < 0.5 \\ \frac{V_{dc} \cdot (3-4D)}{16L} \cdot (2D-1) \cdot T_s + \frac{V_{dc}}{16(L+2M)} \cdot T_s & 0.5 \le D < 0.75 \\ \frac{V_{dc} \cdot (4D-3)}{8L} \cdot (1-D) \cdot T_s + \frac{V_{dc} \cdot (1-D)}{4(L+2M)} \cdot T_s & 0.75 \le D < 1 \end{cases} \quad (15)$$

which is differs from expressions (7) by the inclusion of a mutual inductance term, M, in the denominator of the second term of each expression; also favoring use of a large value of M as in N-type interleaving. The overall ripple current can be expressed as $$\Delta I_{all} = \begin{cases} \frac{V_{dc} \cdot (1-4D)}{4L} \cdot D \cdot T_s & D < 0.25 \\ \frac{V_{dc} \cdot (4D-1)}{8L} \cdot (1-2D) \cdot T_s & 0.25 \le D < 0.5 \\ \frac{V_{dc} \cdot (3-4D)}{8L} \cdot (2D-1) \cdot T_s & 0.5 \le D < 0.75 \\ \frac{V_{dc} \cdot (4D-3)}{4L} \cdot (1-D) \cdot T_s & 0.75 \le D < 1 \end{cases} \quad (16)$$

which is the same as expression (12). The maximal inductor current ripple is given by $$\Delta I_{L\_max} = \frac{V_{dc} \cdot T_s}{16L} \cdot \frac{1}{8} + \frac{V_{dc}}{16(L+2M)} \cdot T_s \quad (17)$$

The maximal output current ripple is given by:

$$\Delta I_{all\_max} = \frac{V_{dc} \cdot T_s}{8L} \cdot \frac{1}{8} \quad (18)$$

Figure 21:
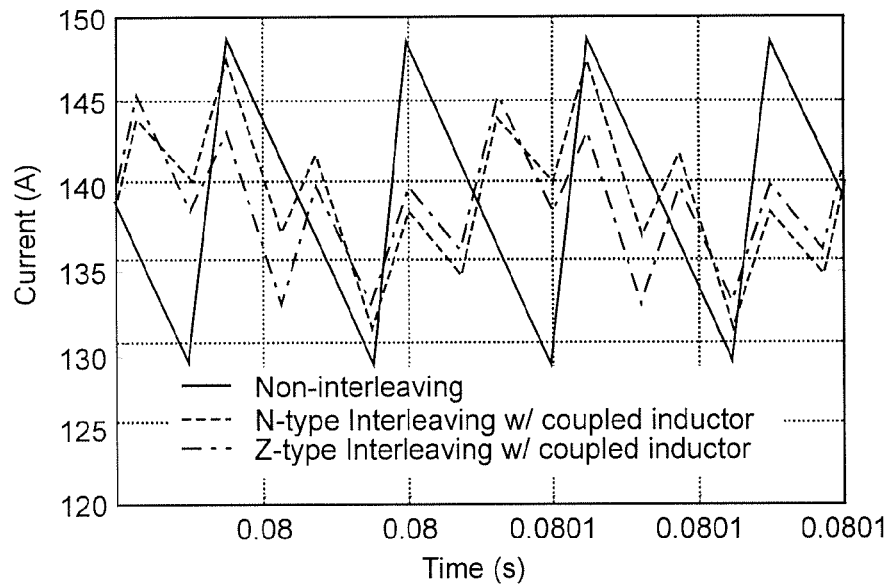
FIG. 21 is a graphical comparison of inductor current ripple waveforms for N-type and Z-type interleaving with non-interleaved operation.
Figure 22:
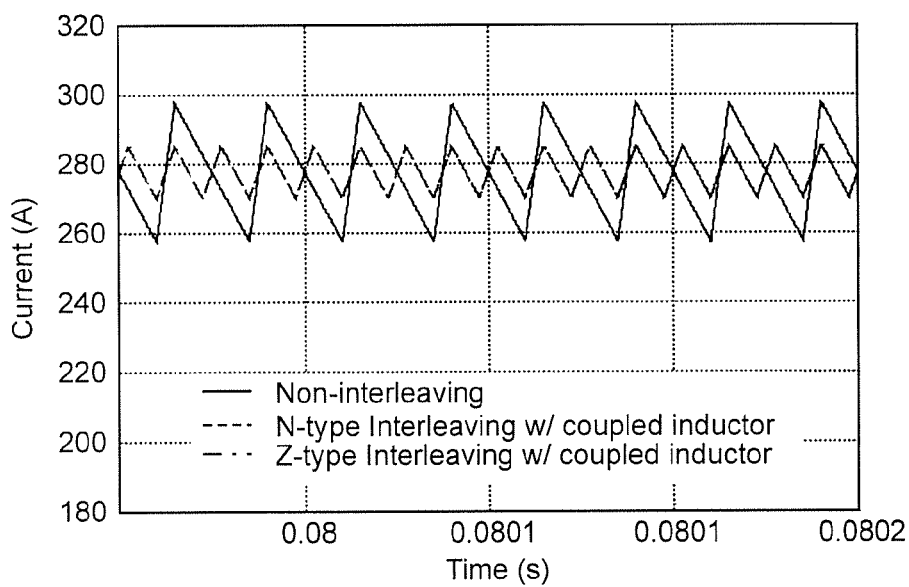
FIG. 22 is a graphical comparison of output current ripple waveforms for N-type and Z-type interleaving with non-interleaved operation.
Figure 23:
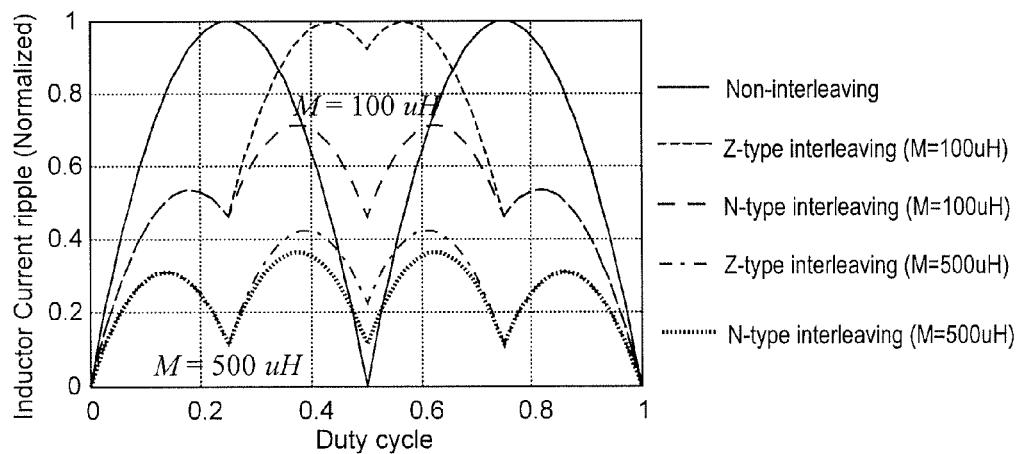
FIG. 23 is a graphical comparison of normalized inductor current ripple for N-type and Z-type interleaving for coupled inductors of different values of mutual inductance with non-interleaved inductor current ripple.
Figure 24:
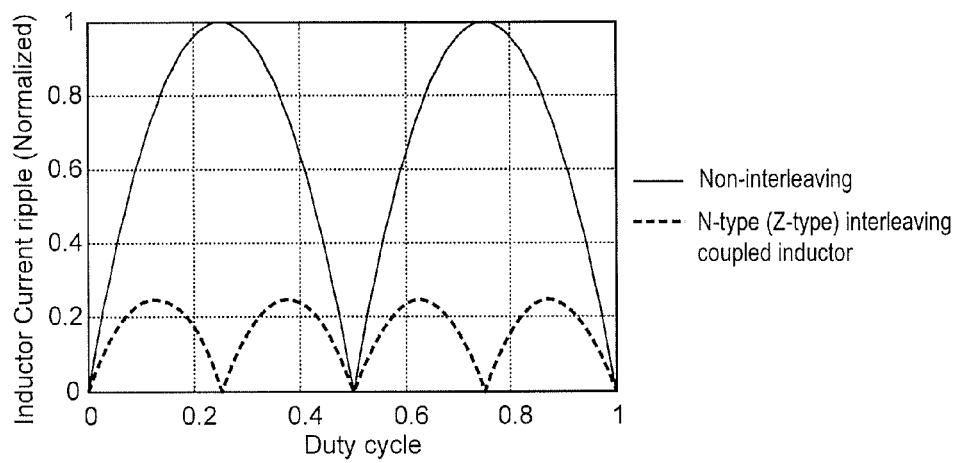
FIG. 24 is a comparison of normalized output current ripple for N-type and Z-type interleaving with non-interleaved operation.

The above analysis was verified for Z-type interleaving and the results shown in FIGS. 21-26 superimposed on the results of N-type interleaving and the non-interleaving case as shown in FIGS. 14-19. FIG. 21 shows that the component of circulating current is somewhat less than for the N-type interleaving and the reduction in circulating current is slightly greater. FIG. 22 shows that the overall output current ripple for Z-type interleaving is substantially identical to that achieved by N-type interleaving. FIG. 23 shows that the inductor current ripple as a function of duty cycle for Z-type interleaving is substantially reduced for some duty cycle ranges, particularly for smaller mutual inductances, but substantially identical for other duty cycle ranges. FIG. 24 shows a slightly greater reduction in output current ripple as a function of duty cycle for Z-type interleaving than for N-type interleaving.

Figure 25:
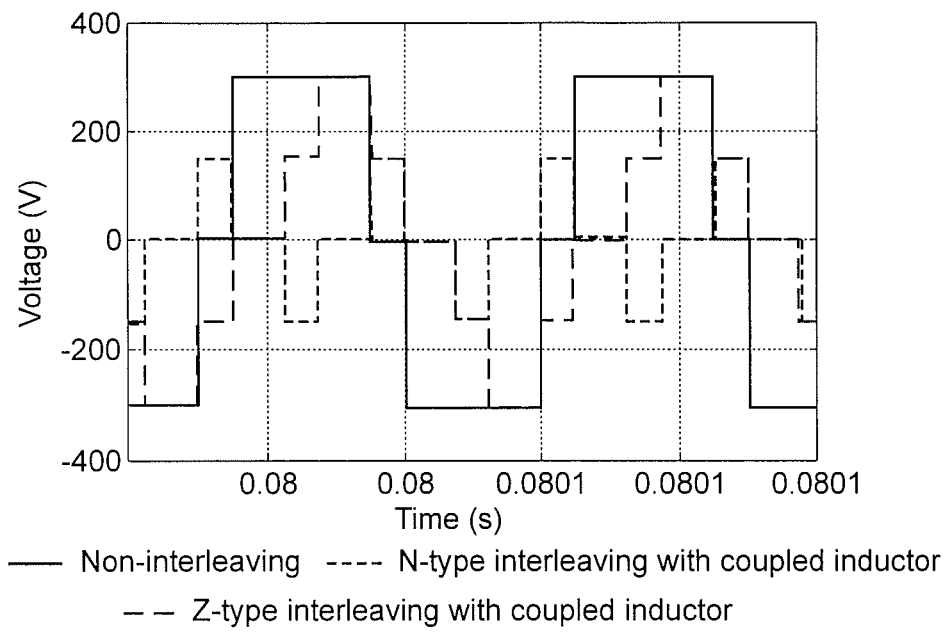
FIG. 25 is a graphical comparison of common mode voltage waveforms for N-type and Z-type interleaved and non-interleaved operation.
Figure 26:
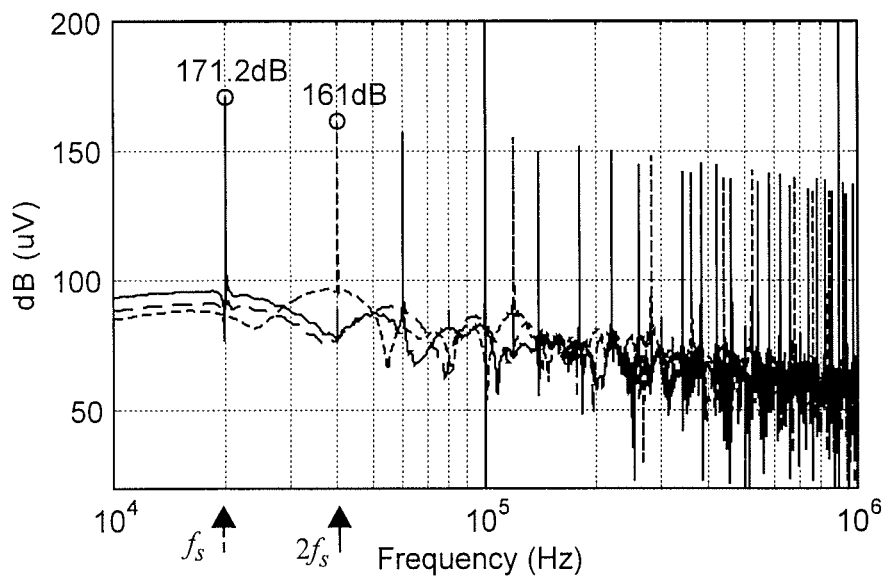
FIG. 26 is a graphical comparison of the common mode voltage spectrum for N-type and Z-type interleaved and non-interleaved operation, FIG. 27 schematically illustrates N-type interleaving in a three-phase, three-level power converter with a coupled inductor.

FIG. 25 differs substantially from FIG. 18 in regard to the CM noise voltage waveforms produced by Z-type interleaving but FIG. 26 show a much lesser in reduction is CM noise magnitude and that the frequency of the lowest frequency spectral peak is at the fundamental switching frequency and thus has limited benefit in regard to CM noise.

An extension of the above basic principles and application of the invention to three phases of legs will now be discussed in regard to FIGS. 27-33 for N-type interleaving and FIGS. 34-35 for Z-type interleaving. Extension to an arbitrary number of phases will be discussed in connection with FIG. 36.

Figure 27:
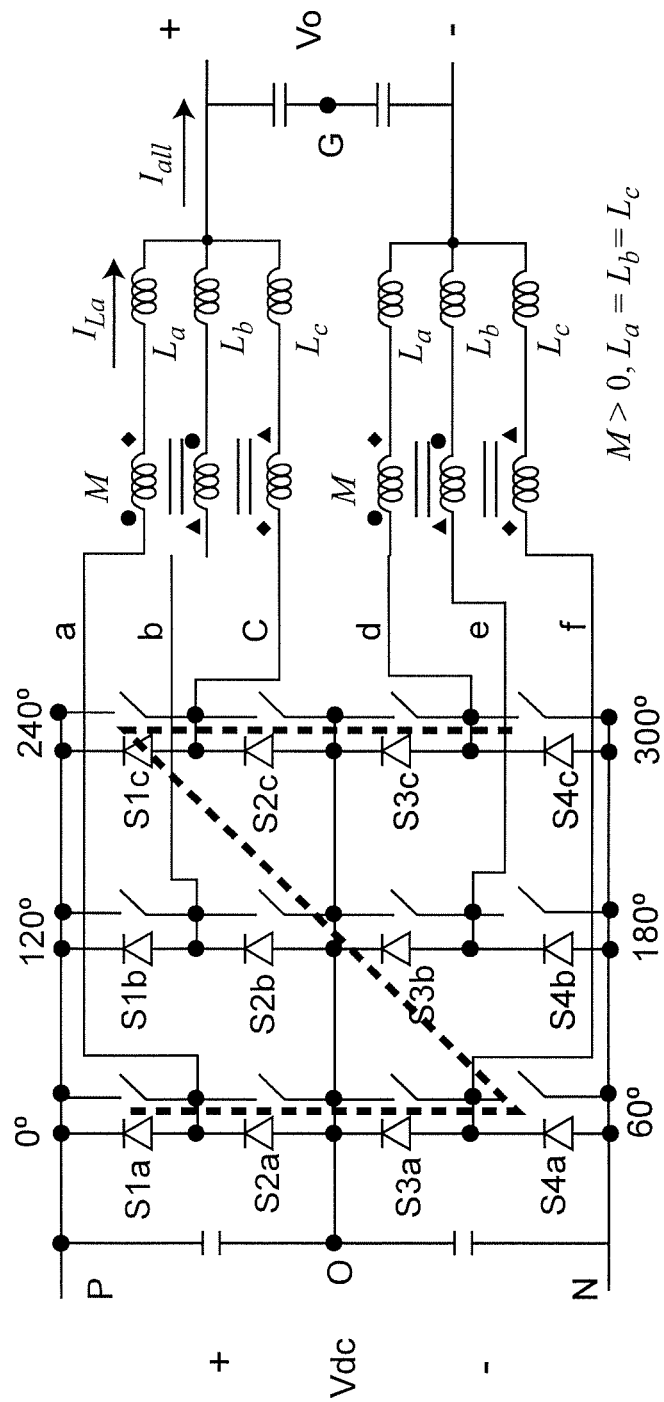

A schematic diagram of a three-phase embodiment is shown in FIG. 27. It should be noted that the reverse-coupling of the three-phase coupled inductors follows the phase sequence indicated in the following Table VI for N-type interleaving.

TABLE VI

| Three-phase N-type Interleaving | | | | | |
|---|---|---|---|---|---|
| Phase 1 | | Phase 2 | | Phase 3 | |
| $S_{1a}$ | 0 | $S_{1b}$ | $\pi/3$ (120°) | $S_{1c}$ | $4\pi/3$ (240°) |
| $S_{4a}$ | $\pi/6$ (60°) | $S_{4b}$ | $\pi$ (180°) | $S_{4c}$ | $5\pi/3$ (300°) |

For the non-interleaving case the inductor current ripple is given by expression (3). Therefore, the total output current ripple will the three times the output current ripple of each individual phase and is given by:

$$\Delta I_{all} = 3 \cdot \Delta I_L = \begin{cases} \frac{3 \cdot V_{dc} \cdot T_s}{4L} \cdot (1-2D) \cdot D & 0 < D \le 0.5 \\ \frac{3 \cdot V_{dc} \cdot T_s}{4L} \cdot (1-D) \cdot (2D-1) & 0.5 \le D < 1 \end{cases} \quad (19)$$

The maximal output current ripple is thus:

$$\Delta I_{all\_max} = \frac{V_{dc} \cdot T_s}{8L} \cdot \frac{3}{8} \quad (20)$$

For Interleaved operation with coupled inductors, the inductor current ripple is expressed as:

$$\Delta I_L = \begin{cases} \frac{V_{dc} \cdot (1-6D)}{12L} \cdot D \cdot T_s + \frac{1}{3} \cdot \frac{V_{dc} \cdot D \cdot T_s}{L+3 \cdot M} & 0 < D < \frac{1}{6} \\ \frac{V_{dc} \cdot (1-3D)}{36L} \cdot (6D-1) \cdot T_s + \frac{1}{3} \cdot \frac{V_{dc} \cdot D \cdot T_s}{L+3 \cdot M} & \frac{1}{6} < D < \frac{1}{3} \\ \frac{V_{dc} \cdot (1-2D)}{12L} \cdot (3D-1) \cdot T_s + \frac{1}{9} \cdot \frac{V_{dc} \cdot T_s}{L+3 \cdot M} & \frac{1}{3} < D < \frac{1}{2} \\ \frac{V_{dc} \cdot (2-3D)}{12L} \cdot (2D-1) \cdot T_s + \frac{1}{9} \cdot \frac{V_{dc} \cdot T_s}{L+3 \cdot M} & \frac{1}{2} < D < \frac{2}{3} \\ \frac{V_{dc} \cdot (5-6D)}{36L} \cdot (3D-2) \cdot T_s + \frac{1}{3} \cdot \frac{V_{dc} \cdot (1-D) \cdot T_s}{L+3 \cdot M} & \frac{2}{3} < D < \frac{5}{6} \\ \frac{V_{dc} \cdot (1-D)}{12L} \cdot (6D-5) \cdot T_s + \frac{1}{3} \cdot \frac{V_{dc} \cdot (1-D) \cdot T_s}{L+3 \cdot M} & \frac{5}{6} < D < 1 \end{cases} \quad (21)$$

As in the two-phase embodiment, the mutual inductance value appears in the denominator of the second term of the expression for each duty cycle range. Therefore, larger values of M provided greater degrees of cancellation of the circulating current and are thus preferred. Also as with the two-phase N-type interleaved embodiment described above, the overall current ripple will be reduced because of ripple cancellation among the interleaved phases as given by:

$$\Delta I_{all} = \begin{cases} 3 \cdot \dfrac{V_{dc} \cdot (1-6D)}{12L} \cdot D \cdot T_s & D < \dfrac{1}{6} \\ 3 \cdot \dfrac{V_{dc} \cdot (1-3D)}{36L} \cdot (6D-1) \cdot T_s & \dfrac{1}{6} < D < \dfrac{1}{3} \\ 3 \cdot \dfrac{V_{dc} \cdot (1-2D)}{12L} \cdot (3D-1) \cdot T_s & \dfrac{1}{3} < D < \dfrac{1}{2} \\ 3 \cdot \dfrac{V_{dc} \cdot (2-3D)}{12L} \cdot (2D-1) \cdot T_s & \dfrac{1}{2} < D < \dfrac{2}{3} \\ 3 \cdot \dfrac{V_{dc} \cdot (5-6D)}{36L} \cdot (3D-2) \cdot T_s & \dfrac{2}{3} < D < \dfrac{5}{6} \\ 3 \cdot \dfrac{V_{dc} \cdot (1-D)}{12L} \cdot (6D-5) \cdot T_s & \dfrac{5}{6} < D < 1 \end{cases} \quad (22)$$

The maximal inductor current ripple is given by:

$$\Delta I_{L\_max} = \frac{V_{dc} \cdot T_s}{12L} \cdot \frac{1}{24} + \frac{V_{dc}}{9(L+3M)} \cdot T_s \quad (23)$$

and the maximal output current ripple is given by:

$$\Delta I_{all\_max} = \frac{V_{dc} \cdot T_s}{12L} \cdot \frac{1}{8} \quad (24)$$

Figure 28:
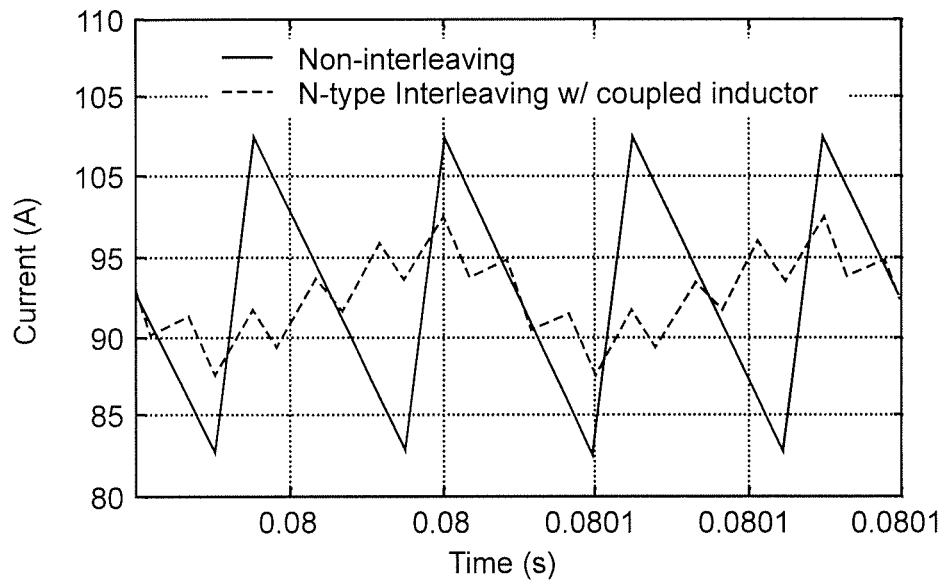
FIG. 28 is a graphical comparison of inductor current waveforms with and without N-type interleaving using a coupled inductor based on simulation.
Figure 29:
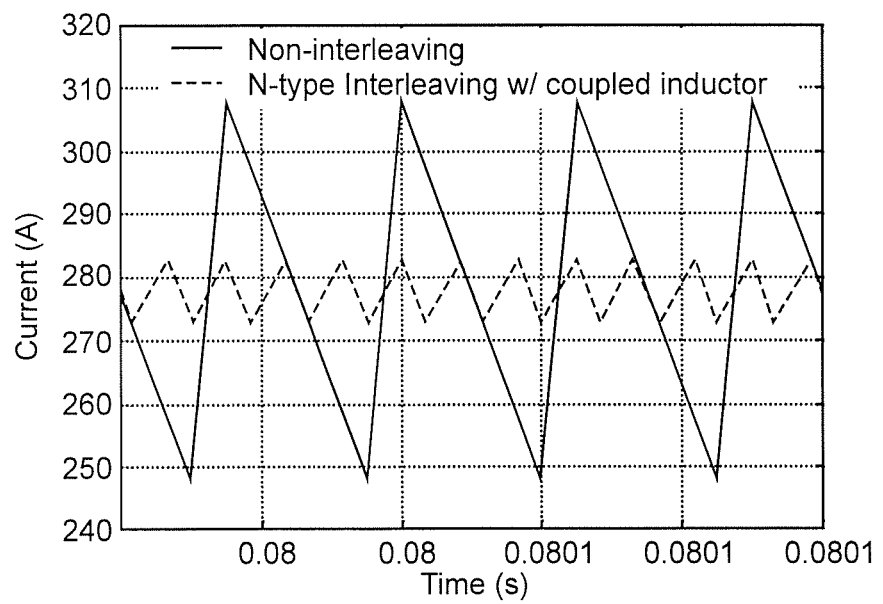
FIG. 29 is a graphical comparison of output current waveforms with and without N-type interleaving using a coupled inductor based on simulation.

The above analysis has been verified by simulation with a power rating of 200 kW, DC link voltage $V_{dc}=1200$V switching period $T_s=50$ μsec., D=0.6, non-coupled inductances L=60 μH, and output capacitors C=180 μF. Mutual inductance M=300 μH was used in the simulation. The simulated waveforms comparing non-interleaved operation with N-type interleaved operation with reverse-coupled inductors are shown in FIG. 28 and waveforms comparing the overall output current ripple are shown in FIG. 29. The inductor current ripple with the coupled inductor is smaller than the non-interleaving case (where the circulating current is zero) and the overall output current ripple is smaller that the non-interleaving case and the two-phase N-type interleaving case due to more effective ripple cancellation by the increased number of phases.

Figure 30:
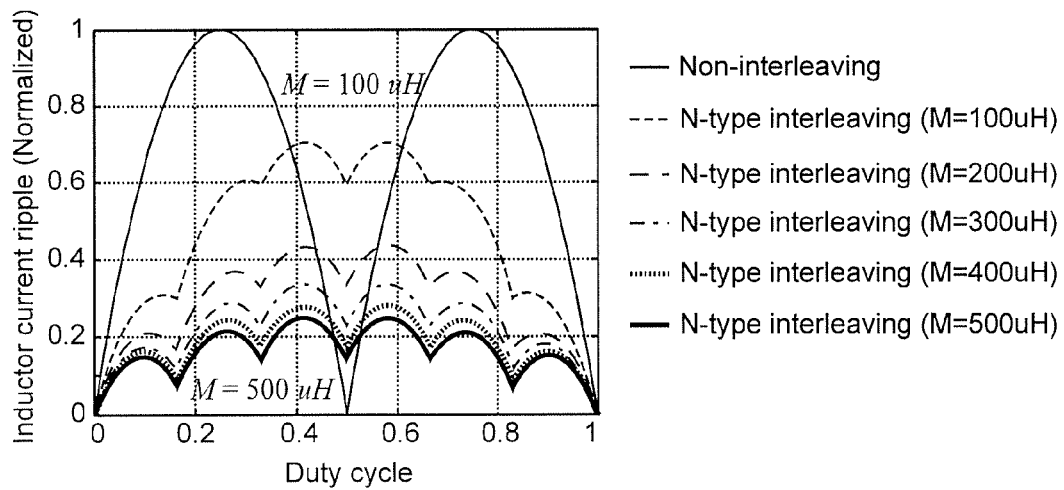
FIG. 30 is a graphical comparison of normalized inductor current ripple for N-type interleaving for coupled inductors of different values of mutual inductance with non-interleaved inductor current ripple based on simulation.
Figure 31:
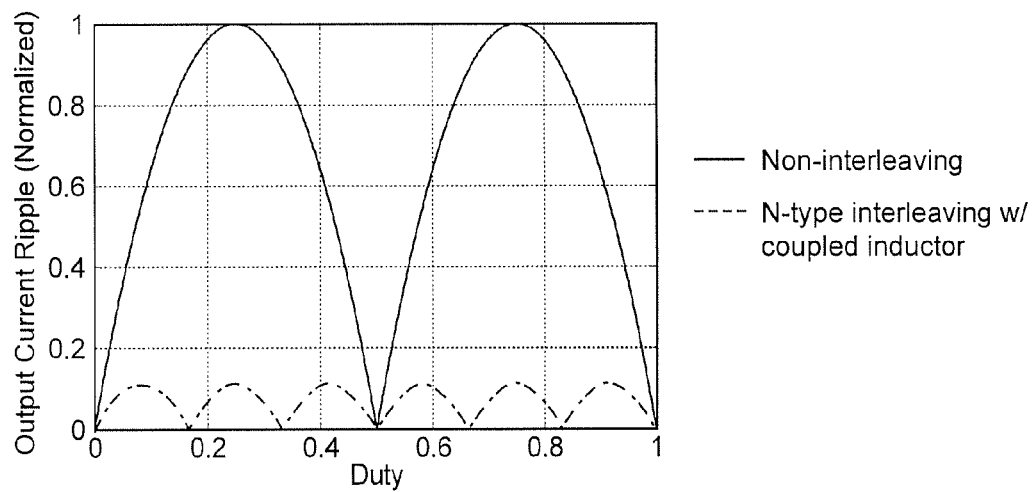
FIG. 31 is a comparison of normalized output current ripple for non-interleaved operation and N-type operation based on simulation.

The normalized inductor current ripple over the range of possible duty cycles is shown in FIG. 30 which illustrates behaviors similar to the two-phase embodiment in regard to increased circulating current cancellation with increasing mutual inductance but exhibits six local maxima rather than four due to similar behaviors over a greater number of duty cycle ranges. The overall normalized output current ripple as a function of duty cycle is illustrated in FIG. 31 which indicates that the maximal output current ripple is reduced to about one-sixth of the non-interleaved case.

Figure 32:
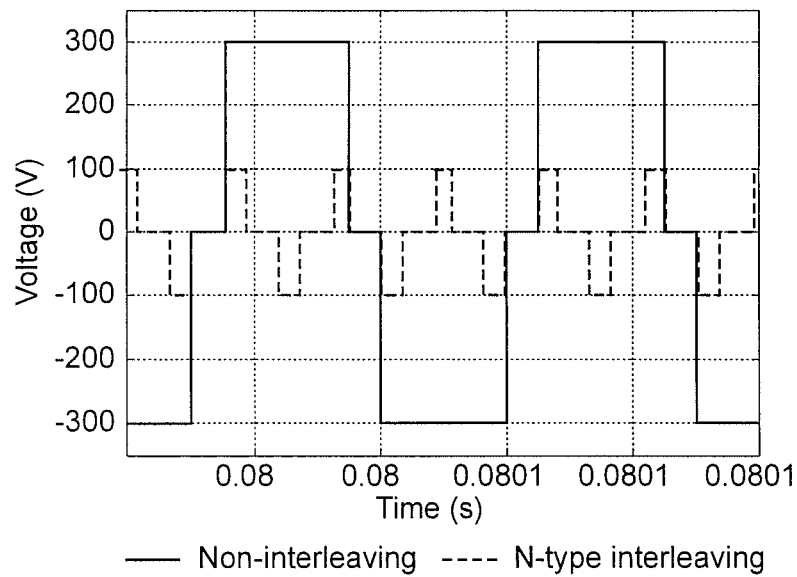
FIG. 32 is a graphical comparison of common mode voltage waveforms for interleaved and non-interleaved operation based on simulation.
Figure 33:
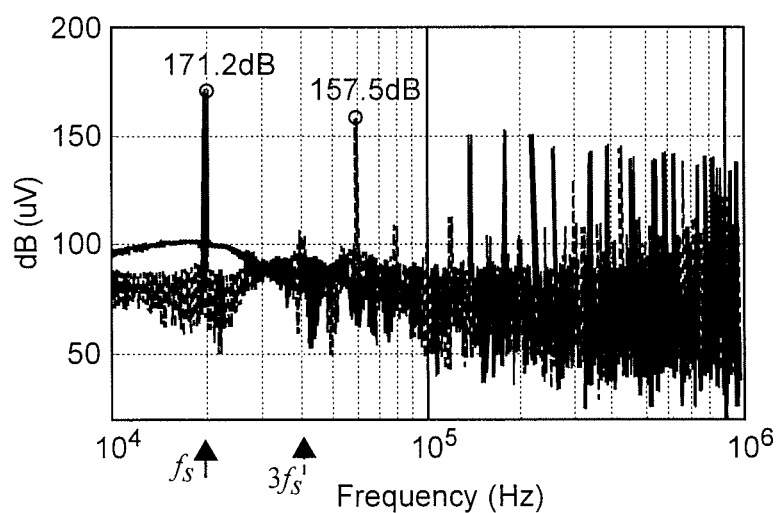
FIG. 33 is a graphical comparison of the common mode voltage spectrum for interleaved and non-interleaved operation based on simulation, FIG. 34 schematically illustrates Z-type interleaving in a three-phase, three-level power converter with a coupled inductor.

The CM noise waveforms for N-type three-phase interleaving are compared with the non-interleaving case in FIG. 32. The very substantial decrease in both amplitude and energy is evident. Perhaps more importantly, as shown in the CM noise voltage spectrum shown in FIG. 33, the amplitude of the lowest frequency spectral peak is even more reduced than the N-type two-phase case and the frequency is increased to three times the switching frequency; potentially further reducing the required size of the required filter, as compared with two-phase embodiments.

Figure 34:
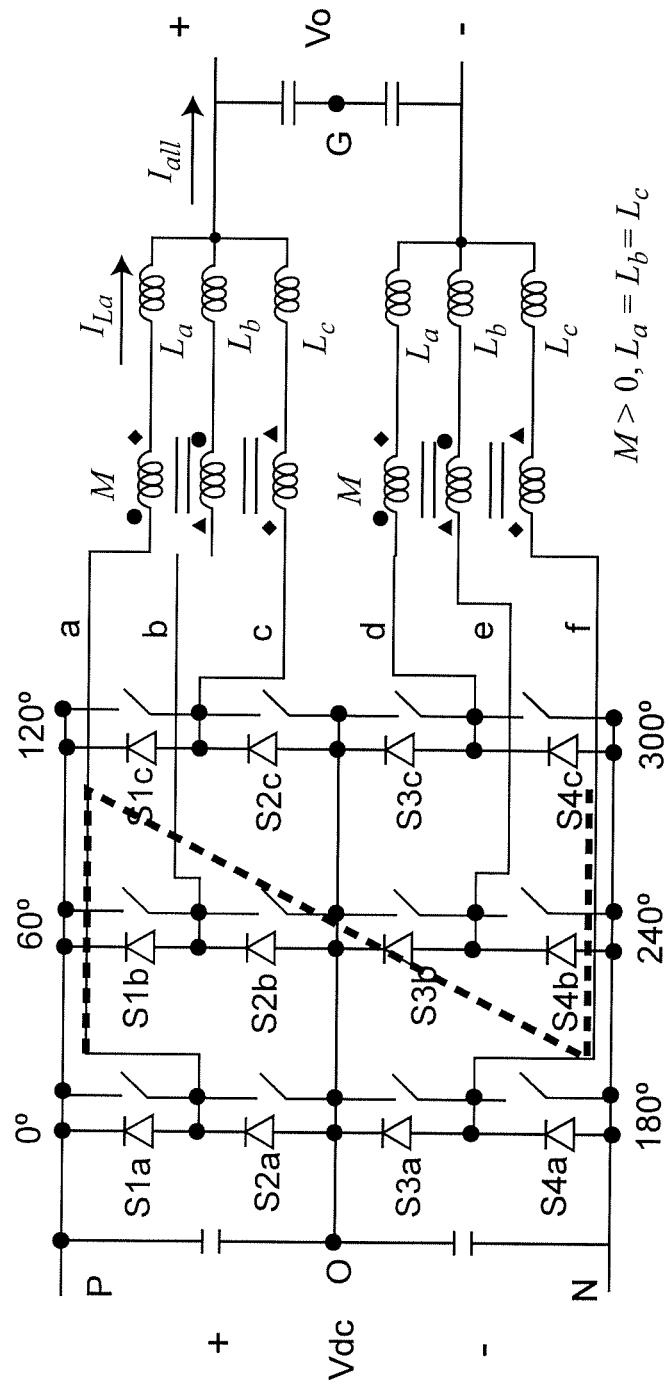

The three-phase Z-type interleaving, the schematic for which is shown in FIG. 34 to be the same as that of FIG. 27 but for the indication of the Z-type switching sequence indicated. The switching turn-on times are provided in Table VII.

TABLE VII

Three-phase Z-type interleaving

| | Phase 1 | | Phase 2 | | Phase 3 |
|---|---|---|---|---|---|
| $S_{1a}$ | 0 | $S_{1b}$ | π/6 (60°) | $S_{1c}$ | π/3 (120°) |
| $S_{4a}$ | π (180°) | $S_{4b}$ | 4π/3 (240°) | $S_{4c}$ | 5π/3 (300°) |

Figure 35:
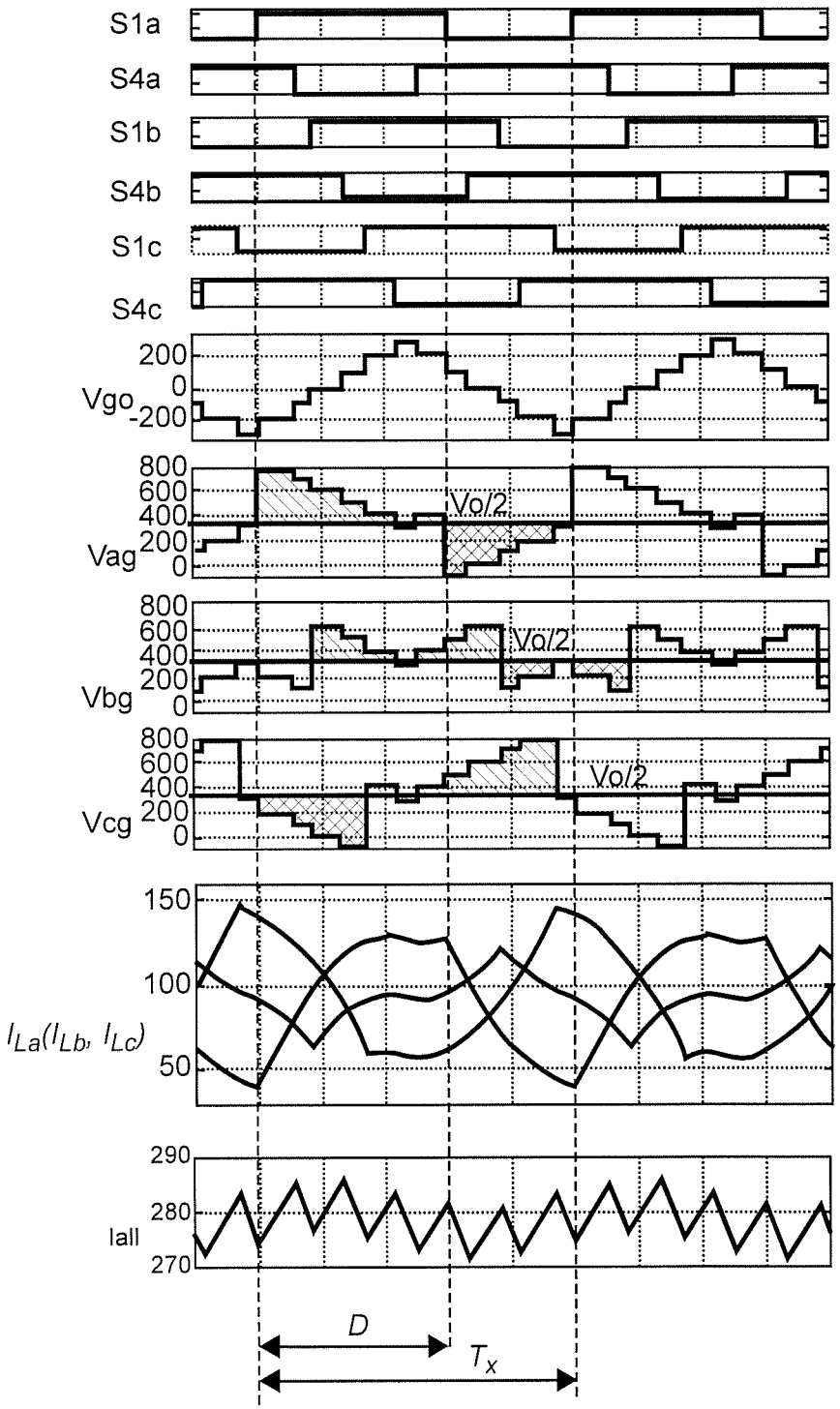
FIG. 35 illustrates waveforms of Z-type interleaving based on simulation.

Simulation of this mode of operation of three-phase Z-type interleaving is shown in FIG. 35 with the duty cycle again of D=0.6 and the resulting waveforms are readily seen to be very different from the N-type interleaving case. Specifically it is seen that $V_{GO}$ is a staircase waveform. This results in $V_{ag}$, $V_{bg}$ and $V_{cg}$ being staircase waveforms of different shapes. The shaded areas are voltage-second products on the respective inductors which results in the waveforms being very different and possibly forming a significant source of differential mode (DM) noise. Since $V_{GO}$ is a staircase waveform and each of the three phases have different phase shifts, the effect of $V_{GO}$ on each phase will be different; yielding different current ripple waveform shapes in each respective phase which is difficult to correct. Therefore, while Z-type interleaving may provide marginally better results than N-type interleaving for a two-phase converter, N-type interleaving is clearly a better choice for three-level converters of three or more phases.

Figure 36:
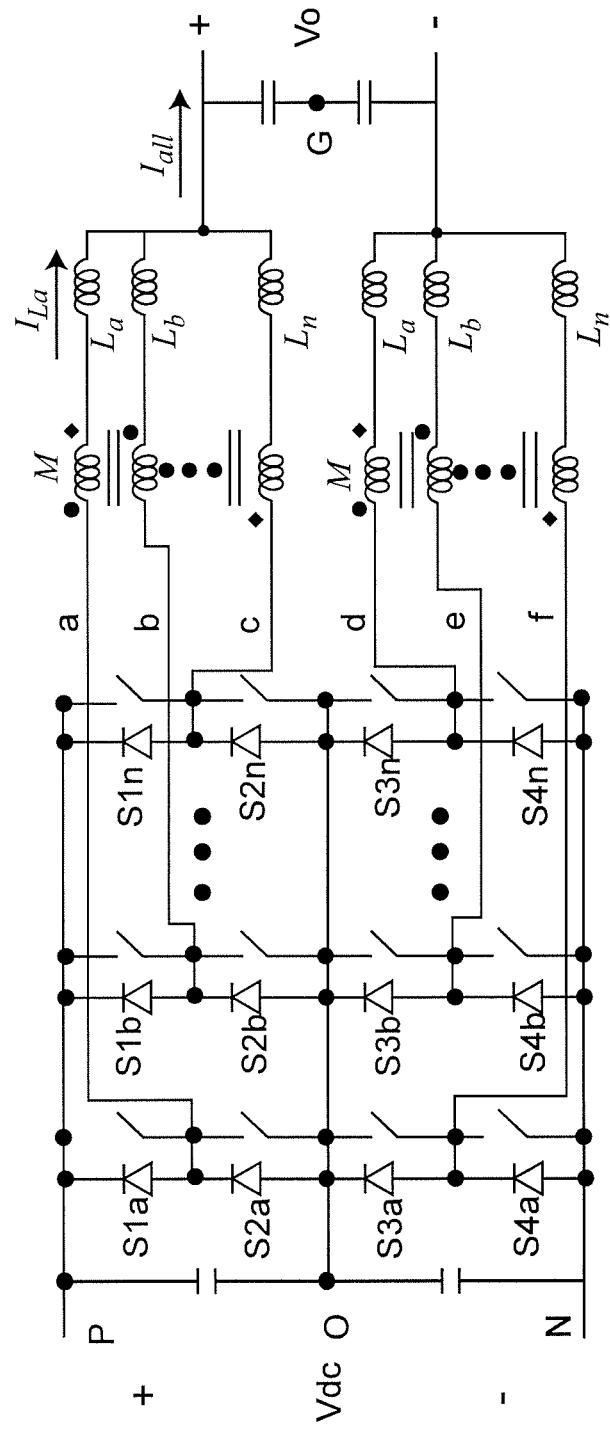
FIG. 36 is a generalized schematic diagram of a multi-phase interleaved three-level DC-DC power converter with a coupled inductor.

The basic principles of the invention can be extended to any arbitrary number of phases. A generalized schematic of a multi-phase three-level converter is shown in FIG. 36. However, as the phase number increases, the circulation current circulates between more phases and the coupling becomes much more complicated but are generally as indicated in FIG. 36. Table VIII provides a generalized specification of phase shifts for N-type interleaving.

TABLE VIII

N phase, N-type interleaving

| Phase 1 | | Phase 2 | | ... | Phase N − 1 | | Phase N | |
|---|---|---|---|---|---|---|---|---|
| $S_{1a}$ | 0 | $S_{1b}$ | 2π/n | ... | $S_{1(n-1)}$ | 2(n − 2)π/n | $S_{1n}$ | 2(n − 1)π/n |
| $S_{4a}$ | π/n | $S_{4b}$ | 3π/n | ... | $S_{4(n-1)}$ | (2n − 3)π/n | $S_{4n}$ | (2n − 1)π/n |

From a comparison of the two-phase and three-phase cases discussed above, it is to be expected that use of more phases will further reduce output (and input) current ripple and CM voltage while increasing the frequency of the lowest frequency peak in the CM noise spectrum. Further, it can be expected that, for N phases the overall current ripple of the interleaving case will be $1/N^2$ of the current ripple of the non-interleaving case with N phases, the frequency of the lowest frequency peak of the CM noise spectrum will be N times the switching frequency and the maximal inductor current ripple can be much smaller than the non-interleaving case as long as a sufficient mutual inductance is provided.

Figure 37:
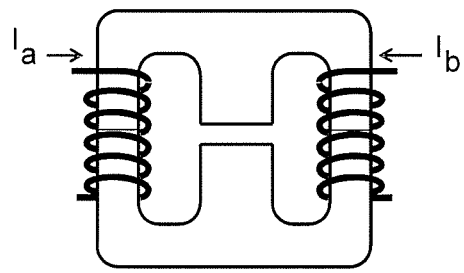
FIG. 37 illustrates a simplified design of an integrated coupled inductor suitable for practice of the invention, FIG. 38 schematically illustrates a three-level, three-phase DC-DC power converter including a coupled inductor.

As alluded to above, the inventors have also discovered that one or more relatively small valued non-coupled inductors and relatively large mutual inductances suitable for practice of the invention as discussed above can be integrated in a single magnetic element, as will now be discussed. A commonly used structure for providing reverse-coupled mutual inductance (without a non-coupled inductance), mostly used in two-level converters is shown in FIG. 37. In this structure, two "E" shaped cores are juxtaposed to form a so-called EE shaped core. The central leg of either or both E shaped cores is of reduced length such that two of the core legs have a smaller gap than the third leg. Windings are placed on the legs with the smaller gap and are oppositely wound so that they are inversely coupled. The leg with the larger gap carries certain leakage flux from the other legs and is usually centrally located, as shown. Two inductors of such structures would be required for three-level converters and such a structure is not suitable for tape-wound construction.

Figure 38:
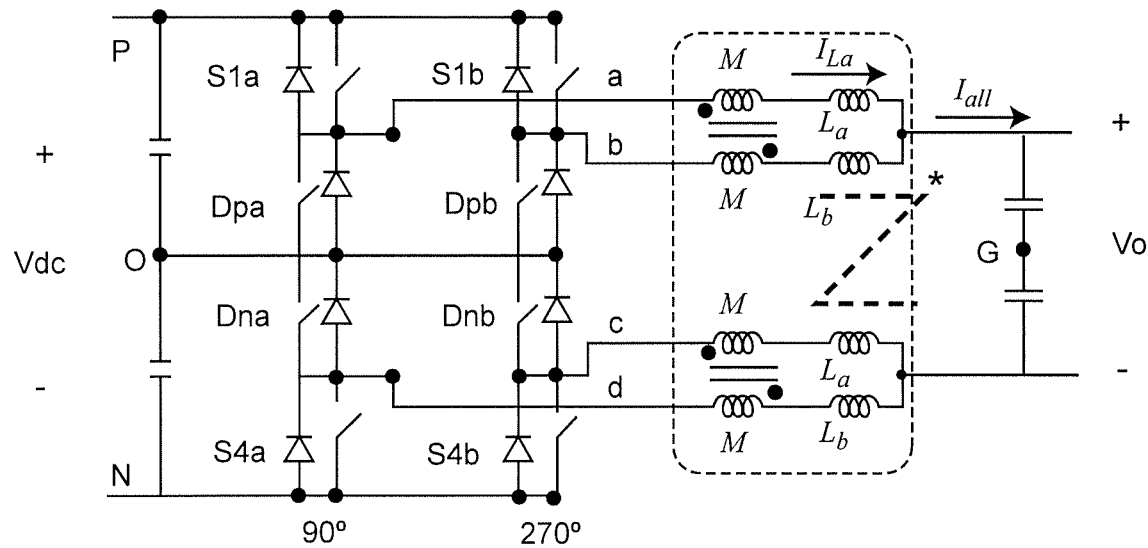

A schematic diagram of a two-phase, three-level converter in which reverse-coupled mutual inductances are integrated is illustrated in FIG. 38. In this circuit, the leakage inductors of the top and bottom coupled inductor are coupled together such that the coupling is positive and the coupling can boost the output inductance of the three-level converter. Based on the above analysis, the total output current ripple is determined by the leakage inductors, and the positive coupling can thus further reduce the output current ripple. That is, expressions (5), (14), (18) and (24 show that output ripple is related to the inductance and has nothing to do with mutual inductance.

Figure 39:
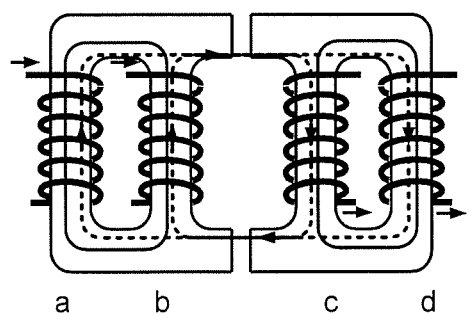
FIG. 39 illustrates the basic principles of an integrated coupled inductor.
Figure 40:
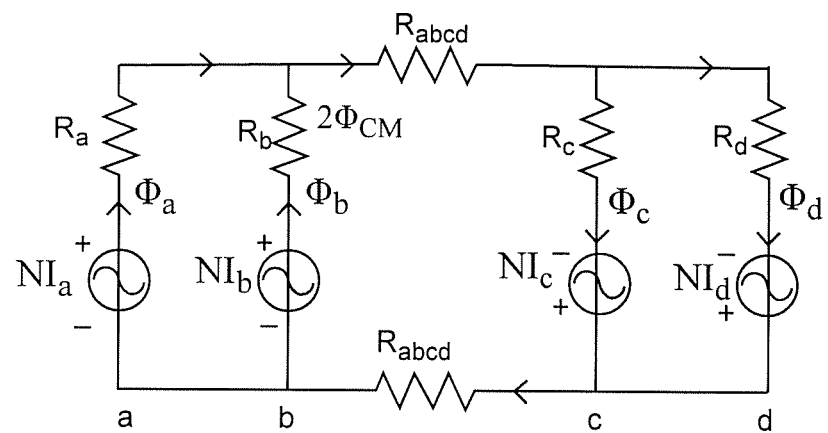
FIG. 40 illustrates the magnetic circuit of the coupled inductor of FIG. 39, FIG. 41 schematically illustrates differential mode (DM) flux in the magnetic circuit of FIG. 40, FIG. 42 schematically illustrates an equivalent circuit and waveform for DM flux generated by DM voltage.
Figure 41:
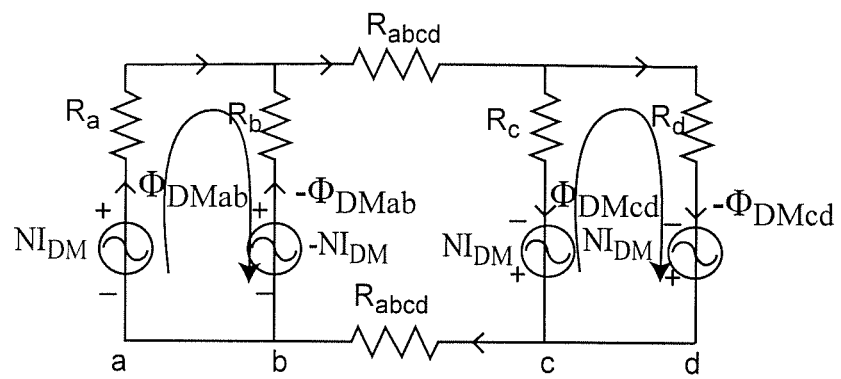
Figure 42:
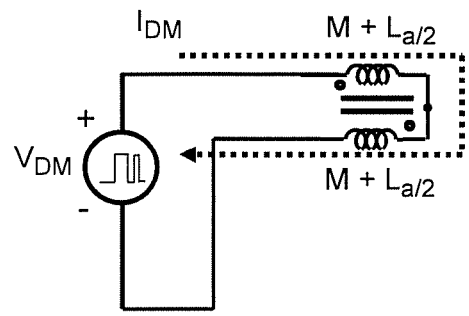
Figure 42:
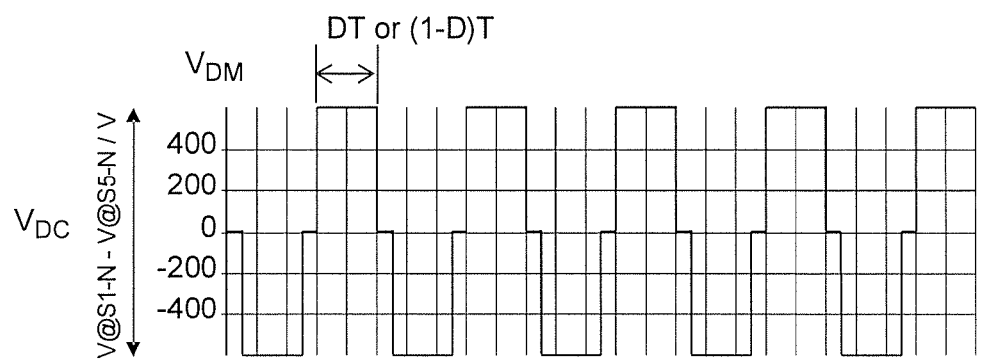

More specifically, the inventors have discovered that an integrated inductor can be built to achieve both suppression of circulating current and boosting output inductance as indicated by the dashed box in FIG. 38. A simple inductor structure shown in FIG. 39 can be used to explain the basic principle of operation. For reference, the left two legs are labeled a and b and the right two legs are labeled c and d and both pairs of legs are magnetically coupled across one or more air gaps. The windings on the four legs should be arranged as shown such that the windings on legs a and b and legs c and d are each inversely coupled and the polarity between windings a and c, a and d, b and c and b and d should all be positive. If the windings are arranged in such a manner, there will be two parts of the magnetic flux in the core; one part being generated by the circulating current, indicated by the solid loops in FIG. 39 and the other generated by the common mode or output current, shown by the dashed loops in FIG. 39. The simplified magnetic circuit for this structure is shown in FIG. 40 which is driven by four sources which are excited by the current in each winding as shown in FIG. 41. The differential mode (DM) flux can be calculated from the differential mode current/voltage between windings a and b or c and d. The equivalent DM circuit and the DM voltage on windings a and b is shown in FIG. 42. It follows that the expressions for common mode flux are:

$$\Phi_{DM} = \frac{NI_{DM}}{R_a} = \begin{cases} \frac{V_{DC}DT}{2N} & (D \leq 0.5) \\ \frac{V_{DC}(1-D)T}{2N} & (D > 0.5) \end{cases} \quad (25)$$

Figure 43:
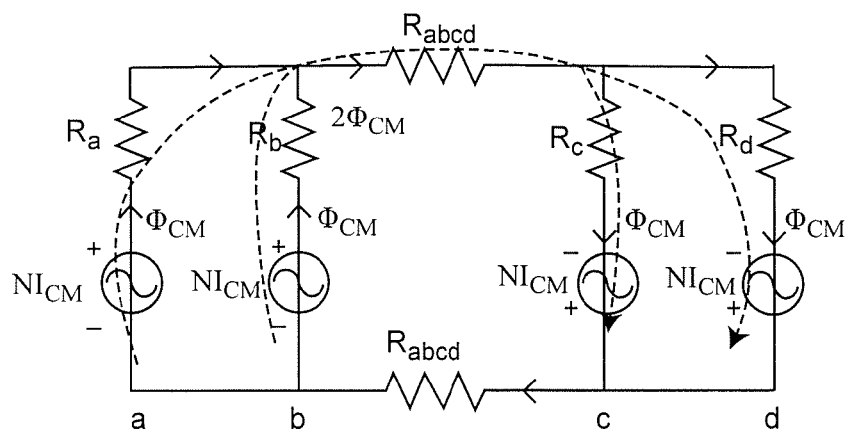
FIG. 43 illustrates CM flux in the magnetic circuit of FIG. 40.

The common mode (CM) flux is generated by the CM current as shown in FIG. 43. Since the CM current in each winding is simply half of the output current the CM flux can be calculated as:

$$\Phi_{CM} = \frac{NI_{out}}{2(2R_{abcd} + R_a)} \approx \frac{NI_{out}}{4R_{abcd}} \quad (26)$$

For legs a, b, c and d, the flux has two parts: DM flux and CM flux. Therefore the total flux is $$\Phi_{a,b,c,d} = \Phi_{CM} \pm \Phi_{DM} = \Phi_{CM} = \frac{NI_{out}}{2(2R_{abcd} + R_a)} \pm \frac{2NI_{DM}}{2R_a} \quad (27)$$

and the maximum flux density in each individual leg is:

$$B_{a\_max} = \frac{4M_{ac}I_{out}}{2NA_e} + \frac{V_{DC}DT}{4NA_e} = B_{CM} + B_{DM} \quad (28)$$

where N is the turn number for the winding on each leg, $A_e$ is the equivalent cross-sectional area of each leg, $M_{ac}$ is the mutual inductance between winding a and winding c. For the intermediate leg, the flux is simply double the CM flux and its maximum flux density is:

$$B_{abcd} = \frac{NI_{out}}{(2R_{abcd} + R_a)A_{int}} = \frac{4M_{ac}I_{out}}{NA_{int}} \quad (29)$$

where $A_{int}$ is the equivalent cross-sectional area of the intermediate leg.

Figure 44:
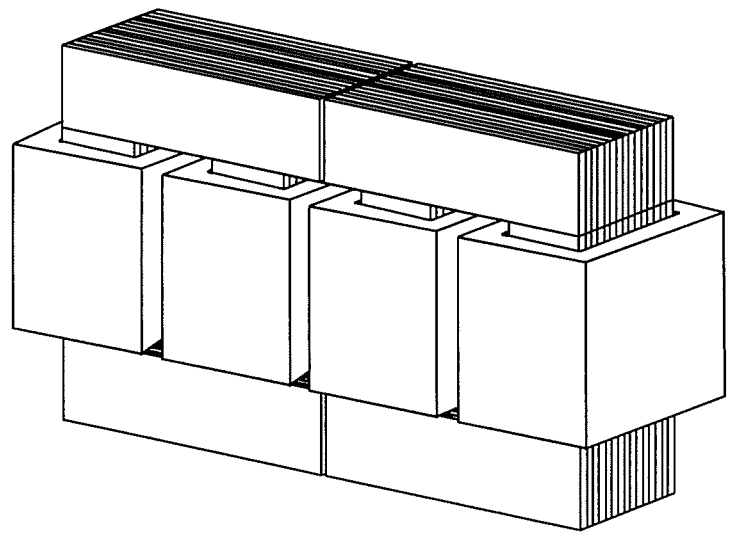
FIG. 44 illustrates one embodiment of an integrated coupled inductor structure.

A straight-forward design for such an integrated magnetic element is shown in FIG. 44 in which the left-most two windings are for the top branches of the converter and the right-most two windings are for the bottom branches of the converter (or vice versa). The left pair and right pair of windings are inversely coupled while the intermediate legs (generally with the air gap(s) or lower permeability material link the left and right pairs of legs to be positively coupled. This simple structure can be built with a ferrite or laminated alloy core.

Figure 45A:
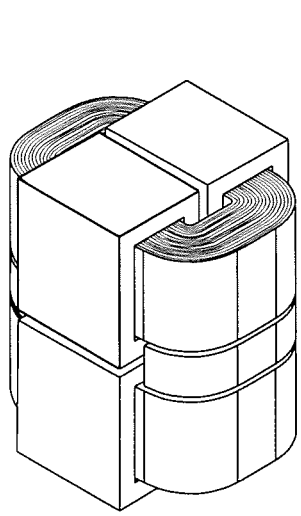
FIGS. 45A and 45B illustrate another embodiment of an integrated coupled inductor structure in both assembled and exploded views.
Figure 45B:
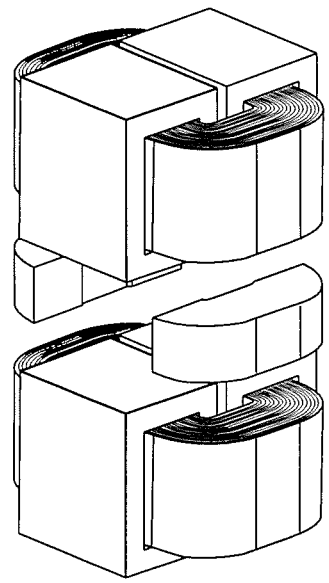
Figure 46:
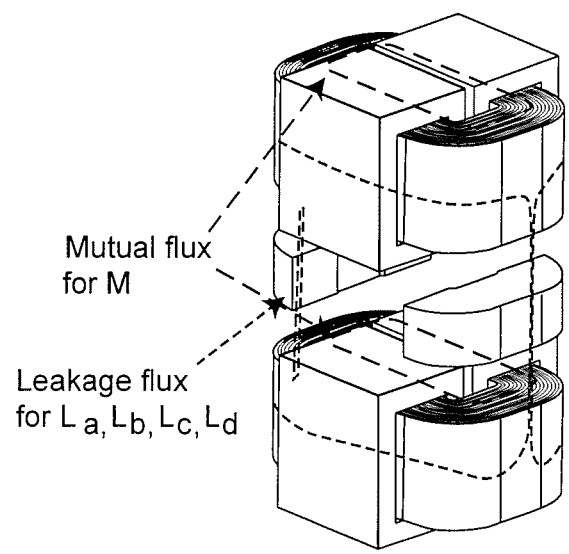
FIG. 46 illustrates flux paths in and exploded view of the integrated coupled inductor circuit of FIGS. 45A and 45B.

However, the above simple structure is unsuitable for some materials which are usually produced as a tape-wound core such as amorphous magnetic alloy, nano-crystalline magnetic alloy and the like. A structure suitable for use of such materials is illustrated in FIGS. 45A and 45B in assembled and exploded forms. Unlike the previously described structure, two of the windings (e.g. a and b) are at the top while the remaining two windings (e.g. c and d) are at the bottom; The pairs of windings are on two C-cut tape-wound cores and two intermediated legs formed from magnetic material powder or the like are set between the top and bottom tape-wound cored to link their leakage flux. The resulting structure is highly integrated, compact and light in weight, easily constructed from convenient materials and highly cost-effective.

In view of the foregoing, it is clearly seen that the invention provides for using interleaving of an arbitrary number of phases to reduce input and output current ripple of three-level power converters to an arbitrarily low level with reduced size and values of inductors and input and output capacitors while reducing the resulting circulating current to a small fraction of that which would ordinarily result from interleaving of phases by the simple expedient of placing reverse-coupled inductors in respective phases and in series in the circulating current path. Further, the invention provides a compact and easily manufactured integrated magnetic element that provides both coupled and non-coupled inductors in the same integrated device while boosting the inductance of the non-coupled inductors to further reduce input and output current ripple.

While the invention has been described in terms of a single preferred embodiment, those skilled in the art will recognize that the invention can be practiced with modification within the spirit and scope of the appended claims.

The invention claimed is:

1. A multi-phase three-level power converter having a plurality of phase legs connected to a load through a common node wherein the conduction angles of respective ones of said phase legs are interleaved, said multi-phase three-level power converter including
an inductor in each phase leg of said multi-phase three-level power converter wherein said inductor of any given phase leg is positively or not significantly coupled magnetically to any corresponding inductor of another phase leg of said multi-phase three level power converter, and
a group of additional inductors having one inductor of said group of additional inductors inversely coupled magnetically and connected in series with said inductor in said given phase leg and another inductor of said group of additional inductors inversely coupled magnetically and connected in series with said inductor in said another phase leg and also in series with said inductor of said given phase leg in a circulating current path through said given phase leg, said common node and said another phase leg of said multi-phase three-level power converter, whereby circulating current in said circulating current path resulting from said interleaving of said conduction angles of respective phases of said multi-phase three-level power converter is reduced by a voltage generated through mutual inductance between said inductor of any given phase and said additional inductor of said group of inductors of any other phase which are inversely coupled magnetically and connected in series in said circulating current path.

2. The multi-phase three-level power converter as recited in claim 1, wherein two phase legs are provided.

3. The multi-phase three-level power converter as recited in claim 1, wherein three phase legs are provided.

4. The multi-phase three-level power converter as recited in claim 1, wherein mutual inductance of said group of additional inductors which are inversely coupled magnetically is greater than inductance of said inductor in each phase leg of said multi-phase three-level power converter.

5. The multi-phase three-level power converter as recited in claim 1, wherein said inductor and said group of additional inductors which are inversely coupled magnetically are integrated into a single magnetic component.

6. The multi-phase three-level power converter as recited in claim 4, wherein said mutual inductance is a multiple of said inductance.

7. The multi-phase three-level power converter as recited in claim 4, wherein said mutual inductance is at least five times said inductance.

8. The multi-phase three-level power converter as recited in claim 5, wherein said inductor and said additional inductors are formed by windings on respective legs of a multi-leg core having an air gap or low permeability material between groups of said legs of said multi-leg core and wherein windings on each of said groups of legs are wound to be inversely coupled and windings on respective groups of said legs are wound to be positively coupled, if at all, through a magnetic circuit having said air gap or low permeability material therein.

9. The multi-phase three-level power converter as recited in claim 5, wherein said inductor and said additional inductors are formed on a tape wound core with intermediate cores placed between cores coupling windings on said respective groups of core legs.

10. The multi-phase three-level power converter as recited in claim 8, wherein said multi-leg core is a ferrite or laminated core.

11. A magnetic element including
a plurality of coils on respective legs of a magnetic core, said plurality of coils including at least two groups of coils wherein respective coils of each group of coils are inversely coupled, and
a magnetic circuit coupling said at least two groups of coils such that each group of coils of said at least two groups of coils is positively or not significantly coupled to each other group of coils.

12. The magnetic element as recited in claim 11, wherein said inductor and said inversely coupled coils are integrated into a single magnetic component.

13. The magnetic element as recited in claim 11, wherein said inductor and said inversely coupled coils are formed by windings on respective legs of a multi-leg core having an air gap or low permeability material between first and second groups of said legs of said multi-leg core and wherein windings on each of said at least two groups of coils are wound to be inversely coupled and windings on respective groups of said legs are positively coupled through a magnetic circuit having an air gap or low permeability material therein.

14. The magnetic element as recited in claim 11, wherein said core is a ferrite or laminated core.

15. The magnetic element as recited in claim 11, wherein said inductor and said inversely coupled coils are formed on a tape wound core with intermediate cores placed between cores coupling windings on said respective groups of legs.

16. A method of reducing output current ripple and circulating current in a three-level DC-DC power converter having a plurality of interleaved phases, said method comprising steps of
connecting at least two phase legs in parallel between a power source and a common output node, each said phase leg including an inductor,
conducting power from a power source through each of said at least two phase legs as three-level DC power in an interleaved manner in which each phase leg conducts power through said inductor at a different phase angle, and
generating a voltage in an additional inductor that is inversely coupled magnetically with said inductor of any given phase leg and connected in series with said inductor of said given phase leg through said common output node, said additional inductor being in a phase leg other than said given phase leg such that current that is not delivered to a load but which is circulating in said at least two phase legs due to said interleaving of said conducting of power in said phase legs in an interleaved manner is reduced.

17. The method of reducing output current ripple in a three-level DC-DC power converter as recited in claim 16, wherein said step of generating a voltage is performed by inversely coupled inductors connected in respective phase legs and in series in a path of said circulating current.

18. The method of reducing output current ripple in a three-level DC-DC power converter as recited in claim 16, wherein a number of parallel connected phase legs is greater than two.

19. The method of reducing output current ripple in a three-level DC-DC power converter and recited in claim 16, further comprising a step of integrating said inductor and said inversely coupled inductors in a single magnetic element.

20. The method of reducing output current ripple in a three-level DC-DC power converter and recited in claim 18, further comprising a step of integrating said inductor and said inversely coupled inductors in a single magnetic element.

* * * * *